United States Patent
Yan et al.

(10) Patent No.: US 8,247,136 B2
(45) Date of Patent: Aug. 21, 2012

(54) CARBON BASED ELECTROCATALYSTS FOR FUEL CELLS

(75) Inventors: Yushan Yan, Riverside, CA (US); Xin Wang, Singapore (SG); Wenzhen Li, Riverside, CA (US); Mahesh Waje, Riverside, CA (US); Zhongwei Chen, Riverside, CA (US); William Goddard, Pasadena, CA (US); Wei-Qiao Deng, Pasadena, CA (US)

(73) Assignee: The Regents of the University of California, Oakland, CA (US)

( * ) Notice: Subject to any disclaimer, the term of this patent is extended or adjusted under 35 U.S.C. 154(b) by 989 days.

(21) Appl. No.: 11/376,768

(22) Filed: Mar. 15, 2006

(65) Prior Publication Data
US 2010/0159305 A1 Jun. 24, 2010

Related U.S. Application Data

(60) Provisional application No. 60/661,770, filed on Mar. 15, 2005, provisional application No. 60/662,284, filed on Mar. 16, 2005, provisional application No. 60/735,777, filed on Nov. 12, 2005.

(51) Int. Cl.
| H01M 4/02 | (2006.01) |
| H01M 4/36 | (2006.01) |
| H01M 4/92 | (2006.01) |
| H01M 8/00 | (2006.01) |
| B05D 5/12 | (2006.01) |

(52) U.S. Cl. ........ 429/524; 429/523; 429/529; 429/530; 429/535; 427/115

(58) Field of Classification Search .............. 429/40, 429/523, 524, 529, 530, 535; 427/115
See application file for complete search history.

(56) References Cited

U.S. PATENT DOCUMENTS
5,277,996 A 1/1994 Marchetti et al.
(Continued)

FOREIGN PATENT DOCUMENTS
DE 101 18 651 A1 10/2002
(Continued)

OTHER PUBLICATIONS

Li et al., Preparation and Characterization of Multiwalled Carbon Nanotube-Supported Platinum for Cathode Catalysts of Direct Methanol Fuel Cells, Jun. 2003, Journal of Physical Chemistry B, 107, 6292-6299.*

(Continued)

*Primary Examiner* — Basia Ridley
*Assistant Examiner* — Sean P Cullen
(74) *Attorney, Agent, or Firm* — Kilpatrick Townsend & Stockton LLP

(57) ABSTRACT

Novel proton exchange membrane fuel cells and direct methanol fuel cells with nanostructured components are configured with higher precious metal utilization rate at the electrodes, higher power density, and lower cost. To form a catalyst, platinum or platinum-ruthenium nanoparticles are deposited onto carbon-based materials, for example, single-walled, dual-walled, multi-walled and cup-stacked carbon nanotubes. The deposition process includes an ethylene glycol reduction method. Aligned arrays of these carbon nanomaterials are prepared by filtering the nanomaterials with ethanol. A membrane electrode assembly is formed by sandwiching the catalyst between a proton exchange membrane and a diffusion layer that form a first electrode. The second electrode may be formed using a conventional catalyst. The several layers of the MEA are hot pressed to form an integrated unit. Proton exchange membrane fuel cells and direct methanol fuel cells are developed by stacking the membrane electrode assemblies in a conventional manner.

19 Claims, 29 Drawing Sheets

U.S. PATENT DOCUMENTS

| | | | |
|---|---|---|---|
| 5,470,680 | A | 11/1995 | Loutfy et al. |
| 6,030,718 | A | 2/2000 | Fuglevand et al. |
| 6,129,301 | A | 10/2000 | Stanley et al. |
| 6,129,901 | A | 10/2000 | Moskovits et al. |
| 6,136,412 | A | 10/2000 | Spiewak et al. |
| 6,245,707 | B1 | 6/2001 | Chu et al. |
| 6,335,112 | B1 | 1/2002 | Asukabe et al. |
| 6,485,858 | B1 | 11/2002 | Baker et al. |
| 6,686,308 | B2 | 2/2004 | Mao et al. |
| 6,706,431 | B2 | 3/2004 | Kawamura et al. |
| 6,790,425 | B1 * | 9/2004 | Smalley et al. ............ 423/447.1 |
| 6,869,721 | B2 | 3/2005 | Imazato |
| 7,056,479 | B2 | 6/2006 | Dodelet et al. |
| 7,098,163 | B2 | 8/2006 | Hampden-Smith et al. |
| 7,129,373 | B2 | 10/2006 | Coleman et al. |
| 7,169,731 | B2 | 1/2007 | Chondroudis et al. |
| 7,205,069 | B2 | 4/2007 | Smalley et al. |
| 7,211,344 | B2 | 5/2007 | Bae et al. |
| 7,241,528 | B2 | 7/2007 | Sudo et al. |
| 2003/0186805 | A1 | 10/2003 | Vanderspurt et al. |
| 2004/0087441 | A1 | 5/2004 | Bock et al. |
| 2004/0167014 | A1 | 8/2004 | Yan et al. |
| 2004/0170884 | A1 | 9/2004 | Frank et al. |
| 2004/0197638 | A1 | 10/2004 | McElrath et al. |

FOREIGN PATENT DOCUMENTS

| | | |
|---|---|---|
| WO | WO 02/36857 A1 | 5/2002 |
| WO | WO 2006/047765 A1 | 5/2006 |

OTHER PUBLICATIONS

Iijima, S., Helical microtubules of graphitic carbon, Nov. 1991, Nature, 354, 56-58.*

A. Damjanovic, et al., "An Analysis of the pH Dependence of Enthalpies and Gibbs Energies of Activation for O2 Reduction at Pt Electrodes in Acid Solutions", Electrochimca Acta, 1990; pp. 1157-1162, vol. 35.

A. Parthasarathy, et al., "Temperature Dependence of the Electrode Kinetics of Oxygen Reduction at the Platinuj/NafionR Interface—A Microelectrode Investigation", Journal of the Electrochemical Society, 1992; pp. 2530-2537, vol. 139.

Walt A. De Heer, et al., "Aligned Carbon Nanotube Films: Production and Optical and Electronic Properties", Science, May 12, 1995; pp. 845-847, vol. 268.

S. K. Zecevic, et al., "Kinetics of O2 Reduction on a Pt Electrode Covered With a Thin Film of Solid Polymer Electrolyte", Journal of the Electrochemical Society, 1997; pp. 2973-2982, vol. 144.

G. Q. Sun, et al., "Iron(III) Tetramethoxyphenylpophyrin (FeTMPP) as Methanol Tolerant Electrocatalyst for Oxygen Reduction in Direct Methanol Fuel Cells", Journal of Applied Electrochemistry, 1998; pp. 1087-1093, vol. 28.

Guangli Che, et al., "Carbon Nanotubule Membranes for Electrochemical Energy Storage and Production", Nature, May 28, 1998; pp. 346-349, vol. 393.

R.W. Reeve, et al., "Methanol Tolerant Oxygen Reduction Catalysts Based on Transition Metal Sulfides", Journal of the Electrochemical Society, 1998; pp. 3463-3471, vol. 145.

R. Yu, et al., "Polatinum Deposition on Carbon Nanotubes Via Chemical Modification", Chem. Mater., 1998; pp. 718-722, vol. 10.

Guangli Che, et al., "Metal-Nanocluster-Filled Carbon Nanotubes: Catalytic Properties and Possible Applications in Electrochemical Energy Storage and Production", Langmuir, 1999; pp. 750-758, vol. 15, No. 3.

S. L. Gojkovic, et al., "Heat-Treated Iron(III) Tetramethoxyphenyl Porphyrin Chloride Supported on High-Area Carbon as an Electrocatalyst for Oxygen Reduction, Part II. Kinetics of Oxygen Reduction", Journal of Electroanalytical Chemistry, 1999; pp. 63-72, vol. 462.

M. Lefevre, et al., "O2 Reduction in PEM Fuel Cells: Activity and Active Site Structural Information for Catalysts Obtained by the Pyrolysis at High Termperature of Fe Precursors", Journal of Physical Chemistry B, 2000; pp. 11238-11247, vol. 104.

T. J. Schmidt, et al., "Oxygen Reduction on Ru(1.92)Mo(0.08)SEO(4), Ru/Carbon, and Pt/Carbon in Pure and methanol-Containing Electrolytes", Journal of the Electrochemical Society, 2000; pp. 2620-2624, vol. 147.

Y. Wang, et al., "Preparation of Tractable Platinum, Rhodium, and Ruthenium Nanoclusters with Small Particle Size in Organic Media", Chem. Mater., 2000; pp. 1622-1627.

V. Lordi, et al., "Method for Supporting Platinum on Single-Walled Carbon Nanotubes for a Selective Hydrogenation Catalyst", Chem. Mater., 2001; pp. 733-737, vol. 13.

C. Lamy, et al., "Recent Advances in the Development of Direct Alcohol Fuel Cells", Journal of Power Sources, 2002; pp. 283-296, vol. 105, No. 2.

D. Chu, et al., "Novel Electrocatalysts for Direct Methanol Fuel Cells", Solid State Ionics, 2002; pp. 591-599, vol. 148.

N. M. Markovic, et al., "Surface Science Studies of Model Fuel Cell Electrocatalysts", Surface Science Reports, 2002; pp. 117-229, vol. 45.

U. A. Paulus, et al., "Oxygen Reduction on Carbon-Supported Pt—Ni and Pt—Co Alloy Catalysts", Journal of Physical Chemistry B, 2002; pp. 4181-4191, vol. 106.

X. G. Li, et al., "Methanol Tolerant FeTPP-Pt/C Co-Catalysts for the Electroreduction of Oxygen", Chinese Chemical Letters, 2002; pp. 1125-1126, vol. 13, No. 11.

A. K. Shukla, et al., "Methanol-Resistant Oxygen-Reduction Catalysts for Direct methanol Fuel Cells", Annual Review of Materials Research, 2003; pp. 155-168, vol. 33.

X. G. Li, et al., "Influence of Methanol on the Kinetics of Oxygen Reduction on Pt/C and CoPcTc/C", Acta Physico-Chimica Sinica, 2003; pp. 380-384, vol. 19.

A. K. Shukla, et al., "Carbon-Supported Pt—Fe Alloy as a Methanol-Resistant Oxygen-Reduction Catalyst for Direct Methanol Fuel Cells", Journal of Electroanalytical Chemistry, 2004; pp. 181-190, vol. 563.

C. Bock, et al., "Size-Selected Synthesis of PtRu Nano-Catalysts: Reaction and Size Control Mechanism", Journal American Chemical Society, 2004; pp. 8028-8037, vol. 126.

C. Wang, et al., "Proton Exchange Membrane Fueil Cells With Carbon Nanotube Based Electrodes", Nano Letters, 2004; pp. 345-348, vol. 4, No. 2.

X. Wang, et al., "Methanol Resistant Cathodic Catalyst for Direct Methanol Fuel Cells", Journal of the Electrochemical Society, 2004; pp. A2183-A2188, vol. 151, No. 12.

M. M. Waje, et al., "Deposition of Platinum Nanoparticles on Organic Functionalized Carbon Nanotubes Grown in Situ on Carbon Paper for Fuel Cells", Nanotechnology, 2005; pp. S395-S400, vol. 16.

X. Wang, et al., "CNT-Based Electrodes With High Efficiency for PEMFCs", Electrochemical and Solid-State Letters, 2005; pp. A42-A44, vol. 8, No. 1.

X. Wang, et al., "Durability Investigation of Carbon Nanotube as Catalyst Support for Proton Exchange Membrane Fuel Cell", Journal of Power Sources (corrected proof), 2005; pp. 1-6.

Wenzhen Li, "Pt—Ru/DWNTs as a High-Performance Anode Catalyst for Direct Methanol Fuel Cells", Jul. 14, 2006, pp. 1-16.

* cited by examiner

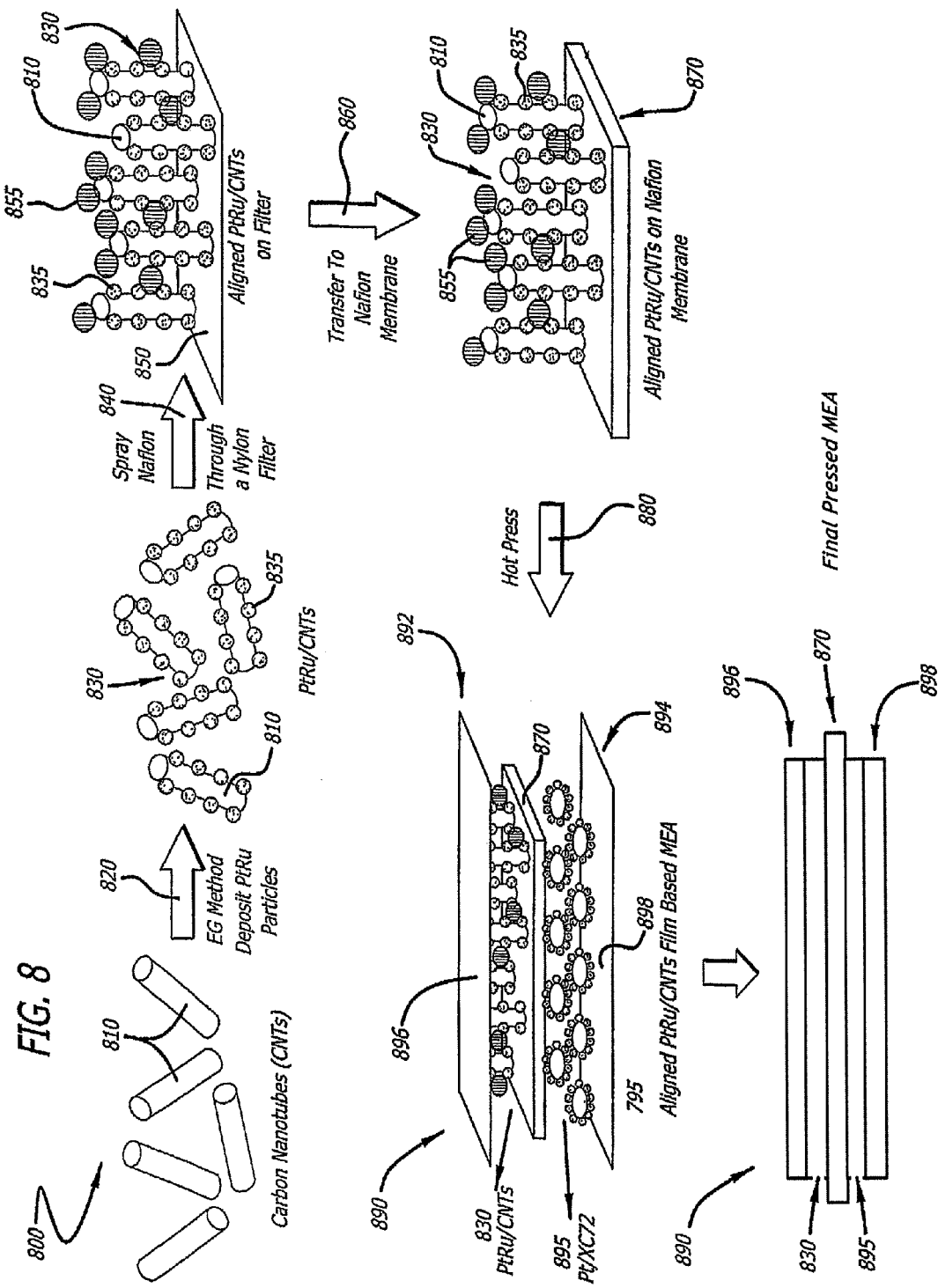

PtRu/MWNTs

PtRu/DWNTs

Pt/SWNTs

CARBON BASED ELECTROCATALYSTS FOR FUEL CELLS

CROSS-REFERENCES TO RELATED APPLICATIONS

This application claims the benefit of U.S. Provisional Application Ser. No. 60/661,770 filed Mar. 15, 2005; U.S. Provisional Application Ser. No. 60/662,284 filed Mar. 16, 2005; and U.S. Provisional Application Ser. No. 60/735,777 filed Nov. 12, 2005; the contents of each of which are hereby incorporated herein by reference.

FEDERALLY SPONSORED RESEARCH

The U.S. Government may have a paid-up license to a patent issuing from this application and the right in limited circumstances to require the patent owner to license others on reasonable terms as provided for by the terms of DOE Grant No. DE-FG02-05ER15716/T-103087.

BACKGROUND OF THE INVENTION

This invention relates to improved electrodes for a membrane electrode assembly (MEA) for use in proton exchange membrane fuel cells (PEMFC) and direct methanol fuel cells (DMFC), and more particularly a method of manufacturing platinum (Pt) and platinum-ruthenium (PtRu) based membrane electrode assemblies using a filtration process incorporating carbon nanomaterials, such as carbon nanotubes.

A fuel cell is a device that converts the chemical energy of a fuel and an oxidant directly into electricity without combustion. The principal components of a fuel cell include electrodes catalytically activated for the fuel (anode) and the oxidant (cathode), and an electrolyte to conduct ions between the two electrodes, thereby producing electricity. The fuel typically is hydrogen or methanol, and the oxidant typically is oxygen or air.

Fuel cells are electrochemical devices that convert chemical energy directly into electrical energy. Compared with internal combustion engines, fuel cells are not limited by the Carnot cycle and in principle could have higher efficiency. With pure hydrogen as the fuel, fuel cells are very environmentally friendly. The combination of high efficiency, low environmental impact, and high power density has been and will continue to be the driving force for vigorous research in this area for a wide variety of applications such as transportation, residential power generation, and portable electronic applications. For portable electronic applications, important features include high power density (i.e., longer battery life) and compactness.

Silicon-based microfabrication technology is amongst the promising approaches for fabrication of compact micro fuel cells. However, the current methods for making electrodes for fuel cells, which typically includes spraying and/or brushing of platinum supported on carbon powder, is incompatible with microfabrication techniques. Therefore, there is need for improved electrodes and methods of preparing such electrodes for PEMFCs and DMFCs.

Direct methanol fuel cells (DMFCs) have attracted enormous attention as a promising power source for portable electronics applications such as laptop computers and cell phones. The interest in commercializing DMFCs is in part due to the fuel cell's simple system design, high energy density and the relative ease with which methanol may be transported and stored, as compared with hydrogen. In the state-of-the-art DMFCs, platinum supported on a carbon substrate is configured in the cathode as a catalyst for activating the oxygen reduction reaction (ORR). A platinum-ruthenium alloy is usually used as the anode electrocatalyst, and may be supported on a carbon substrate. The electrolyte is usually a perfluorosulfonate membrane, for which NAFION (available from DuPont) is a commonly utilized commercially available membrane. One of the major problems encountered in DMFCs is methanol crossover from the anode to the cathode. The permeated methanol causes "poisoning" of the cathode platinum catalyst and depolarization losses due to the simultaneous oxygen reduction and methanol oxidation on the platinum catalyst.

Reference is made herein to the well-known rotating disk electrode, which is used in the testing of the present invention as described below. As will be appreciated by those of ordinary skill in the art, the rotating disk electrode (RDE) consists of a disk on the end of an insulated shaft that is rotated at a controlled angular velocity. Providing the flow is laminar over all of the disk, the mathematical description of the flow is surprisingly simple, with the solution velocity towards the disk being a function of the distance from the surface, but independent of the radial position. The rotating disk electrode is used for studying electrochemical kinetics under conditions, such as those of testing the present invention, when the electrochemical electron transfer process is a limiting step rather than the diffusion process.

Polymer electrolyte based low temperature fuel cells, with their two best known variants, proton exchange membrane fuel cells (PEMFC) and direct methanol fuel cells (DMFC), have been considered promising for powering automobiles, homes, and portable electronics. Their successful commercialization is, however, very much dependent on the activity and durability of their electrocatalysts. At present, all pre-commercial low temperature fuel cells use supported Pt and Pt alloys as their electrocatalysts. The critical properties to consider when choosing an electrocatalyst support include its electrical conductivity, surface area, macro-morphology, microstructure, corrosion resistance, and cost. Carbon black (CB), such as Vulcan XC-72, has been the most widely used electrocatalyst support because of its reasonable balance among electronic conductivity, surface area, and cost. Recently, many nanostructured carbon materials with graphitic structure, such as nanotubes (CNTs), nanofibers (CNF) nanocoils, nanoarrays and nanoporous hollow spheres, have been studied. Among them, CNTs are of particular interest due to their unique electronic and micro and macro structural characteristics. CNTs have also been shown to be more corrosion-resistant than CB under simulated fuel cell operation conditions.

Among the two variants of low temperature fuel cells, DMFCs have been attracting great attention for powering small devices, such as laptop computers, cell phones, and personal digital assistants, because of their high energy density, ease of handling liquid fuel, and low operating temperature. However, the slow electrokinetics of the anode reaction—a methanol oxidation reaction—is still a key problem to the commercialization of DMFCs. Normally, expensive noble metal alloys, typically Pt—Ru, with a high electrode metal loading (e.g., >2.0 mg/cm$^2$) are employed in order to offer a reasonable fuel cell performance (e.g., 80 mW/cm$^2$ at cell temperature of 90° C. and O$_2$ pressure of two atmospheres). It has long been desired for a high performance anode catalyst to be developed so that the electrode metal loading and thus the cost of DMFCs can be reduced.

Some early investigations have found that, by simply replacing CB with CNTs in the conventional ink-paste electrode fabrication method, superior DMFC performance can be obtained. For example, a DMFC single cell with cup-stacked CNTs supported Pt—Ru anode catalyst showed nearly three times the maximum power density of a DMFC with CB (Vulcan XC-72) supported Pt—Ru anode catalyst, and it was suggested that CNTs can provide better charge and mass transfer.

Several types of carbon nanotubes may be used as electrocatalyic supports for low temperature fuel cells, for example, single-walled carbon nanotubes (SWNTs), multi-walled carbon nanotubes (MWNTs) and double-walled carbon nanotubes (DWNTs). SWNTs can have a large surface area (e.g., 500-1000 $m^2/g$) due to their small diameter (e.g., one nm), which is a favorable property as catalysts support. However, they normally contain a significant amount (e.g., two-thirds) of semiconducting tubes, which are poor electron conductors and thus are expected to be a poor electrocatalytic support. MWNTs are highly conducting, but they have limited surface area (e.g., 100-200 $m^2/g$) due to their large diameter (e.g., forty nm). It was recently shown that most DWNTs are conducting tubes and that they can have high surface areas (e.g., 500-1000 $m^2/g$). Thus a natural and logical choice for an electrocatalyst support is DWNTs.

Accordingly, there is a need for, and what was heretofore unavailable, an improved membrane electrode assembly incorporating filtered and/or oriented carbon nanomaterials.

SUMMARY OF THE INVENTION

The present invention is directed to catalysts, electrodes and membrane electrode assembly suitable for use in proton exchange membrane fuel cells (PEMFC) and direct methanol fuel cells (DMFC).

This invention provides a proton exchange membrane fuel cell with nanostructured components, in particular, the electrodes. The nanostructured fuel cell has a higher precious metal utilization rate at the electrodes, higher power density (kW/volume and kW/mass), and lower cost. The nanostructured fuel cells are not only attractive for stationary and mobile applications, but also for use as a compact power supply for microelectronics such as laptops, cell phones and other electronic gadgets. In accordance with one embodiments of the present invention, aligned (oriented) arrays of carbon nanotubes are used as support for catalyst. The aligned array of carbon nanotubes includes single-walled, dual-walled, multi-walled, and cup-stacked carbon nanotubes. The precious metal in the catalyst (e.g., platinum and ruthenium) is deposited using an ethylene glycol reduction method. After depositing precious metal(s), a solubilized perfluorosulfonate ionomer (e.g., NAFION) may be incorporated into the spare space between nanotubes to form a 4-phase boundary (gas, metal, proton conductor, and electron conductor). By assembling the as-prepared electrodes with a membrane, gas diffusion layers and electron collectors, a membrane electrode assembly is developed for incorporation into a fuel cell.

The common catalyst used in proton exchange membrane fuel cells incorporates carbon black as a support structure (FIG. 4). However, carbon black does not provide sufficient simultaneous access of gas, proton, and electron. In addition, membrane electrode assemblies (MEA) using carbon black provide low platinum utilization (20-30%), a dense catalyst layer, low catalyst activity and are difficult mass transport. Conversely, a carbon nanotubes (CNT) or carbon nanofibers when oriented in a film as a catalyst support (FIG. 5) provides a high aspect ratio with high platinum utilization having an easier balance of electron and proton conduction with easier mass transport, resulting from a unique interaction of the carbon nanotubes with the metal particles and a higher electrochemical activity. Such a carbon nanotube or nanofiber films further provide loose packing, orientation and hydrophobicity. Other favorable properties of carbon nanotube and nanofiber films include, but not limited to, high surface area, high electron conductivity and possible proton conductivity by known acid functionalization. Accordingly, a membrane electrode assembly using carbon nanotube or nanofiber films (FIG. 6) will have improved performance (FIGS. 11-14).

The present invention also includes a filtration method for preparing the catalyst layer that is much simpler and faster than the traditional ink-paste method. This filtration method allows the catalyst layer to be transferred to the proton conductive membrane by hot pressing. The filtration method significantly advantageous over known spraying processes by being much faster (e.g., seconds vs. minutes). It can also lead to a partially oriented catalyzed carbon nanotube film. Higher PEMFC and DMFC performance may be achieved by the filtration method mainly due to improved platinum utilization and the super-hydrophobicity of the carbon nanotubes. Accordingly, the electrode fabrication method of the present invention is another important factor for obtaining a high fuel cell performance.

The PEMFC process of the present invention includes depositing platinum on carbon nanotubes to form the catalyst using ethylene glycol (EG) in the reduction process. The platinum carbon nanotubes for the use in the cathode are formed by filtering the carbon nanotubes onto Nylon or other suitable filter substrate. The oriented (aligned) carbon nanotubes are dried and then transferred onto a proton exchange membrane (PEM). A cathode diffusion layer is positioned on the outside of the platinum carbon nanotubes. A membrane electrode assembly (MEA) is formed by sandwiching the anode catalyst (e.g., Pt/XC72) between the PEM and an anode diffusion layer that form the anode. The several layers of the MEA are hot pressed to form an integrated unit.

The DMFC process of the present invention includes depositing platinum-ruthenium on carbon nanotubes to form the catalyst using ethylene glycol (EG) in the reduction process. The platinum-ruthenium carbon nanotubes for the use in the anode are formed by adding (spraying) NAFION and filtering the carbon nanotubes onto Nylon or other suitable filter substrate. The oriented (aligned) carbon nanotubes are dried and then transferred onto a proton exchange membrane (PEM). An anode diffusion layer is positioned on the outside of the platinum-ruthenium carbon nanotubes. A membrane electrode assembly (MEA) is formed by sandwiching the cathode catalyst (e.g., Pt/XC72) between the PEM and a cathode diffusion layer that form the cathode. The several layers of the MEA are hot pressed to form an integrated unit.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 8 is a schematic of the method of preparing a membrane electrode assembly for an anode for a DMFC.

DETAILED DESCRIPTION OF THE INVENTION

Figure 1:
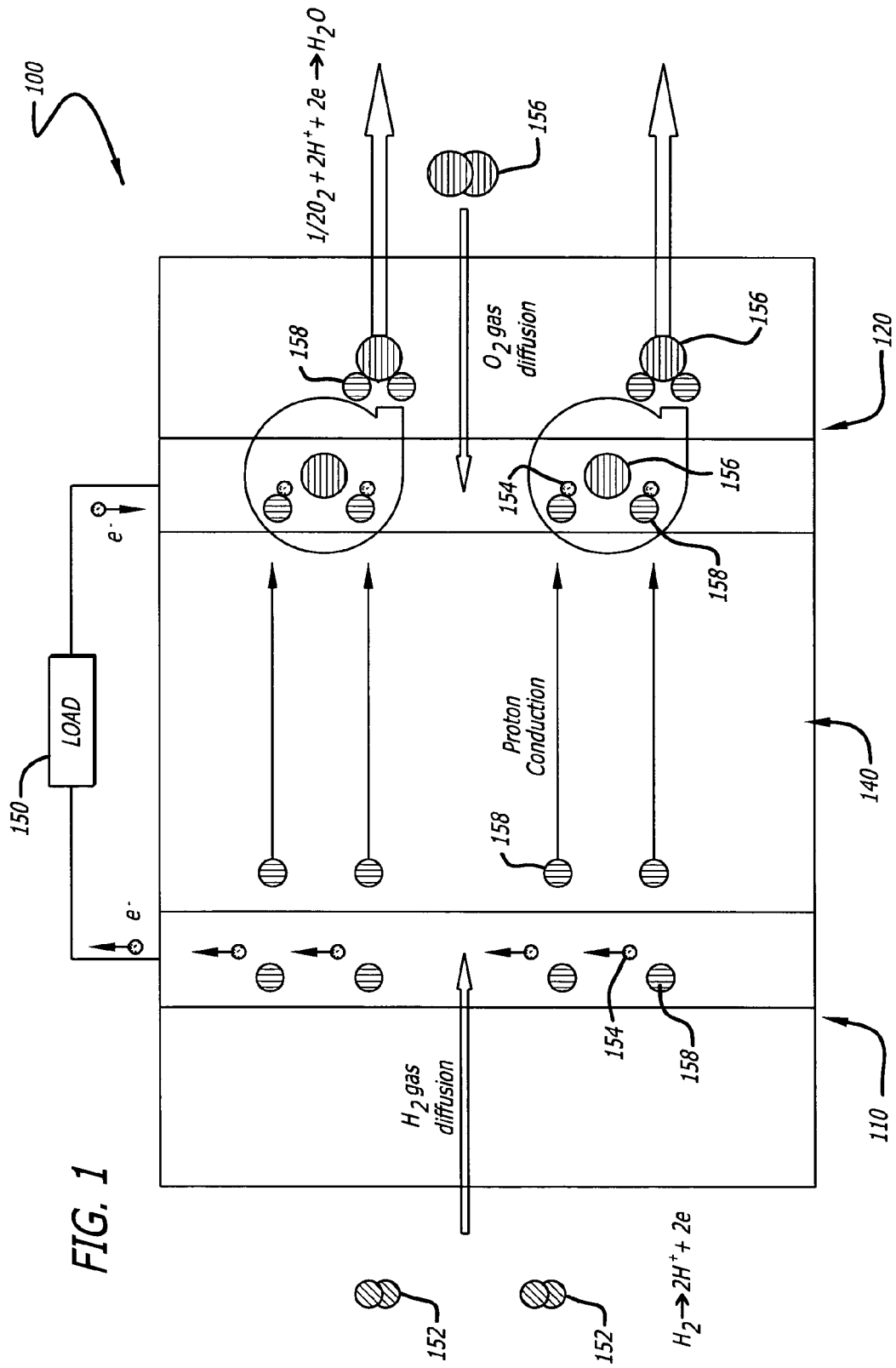
FIG. 1 depicts a schematic diagram of a membrane electrode assembly for a proton exchange membrane fuel cell.

As shown in the drawings for purposes of illustration, the present invention is directed to membrane electrode assemblies (MEA) for proton exchange membrane fuel cells (PEMFC) and direct methanol fuel cell (DMFC). The electrodes (cathode for PEMFC and anode for DMFC) are configured (ethylene glycol deposition process) with platinum (Pt) or platinum-ruthenium (PtRu) containing carbon nanotubes (CNT) that are oriented on a membrane. A filtering process (ethanol based) is used to align (orient) the CNTs, such as single-walled, dual-walled, multi-walled and cup-stacked (stacked-cupped) onto a NAFION membrane to form the catalyst electrode. The MEA is produced by drying and pressing an anode and a cathode to each side of a proton exchange membrane, typically configured from a perfluorosulfonate membrane, such as NAFION (available from DuPont). Multiple MEAs are then combined in a stack having gas pathways to form an operable and testable fuel cell.

As shown in FIG. 1, a PEMFC 100 consists of an anode 110, a cathode 120, and a proton exchange membrane (PEM) 140. The assembly of these three components is usually called a membrane electrode assembly (MEA). If pure hydrogen ($H_2$) 152 is used as fuel, hydrogen is oxidized in the anode and oxygen ($O_2$) 156 is reduced in the cathode. The protons 158 and electrons 154 produced in the anode are transported to the cathode through the proton exchange membrane and external conductive circuit having a load 150, respectively. Water ($H_2O$) is produced on the cathode as a result of the combination of protons and oxygen. In order to make the catalyst accessible by reactant gases, a hydrophobic diffusion layer consisting of carbon particles and polytetrafluoroethylene (PTFE) is usually used to manage the water content around the catalyst layer.

Figure 2:
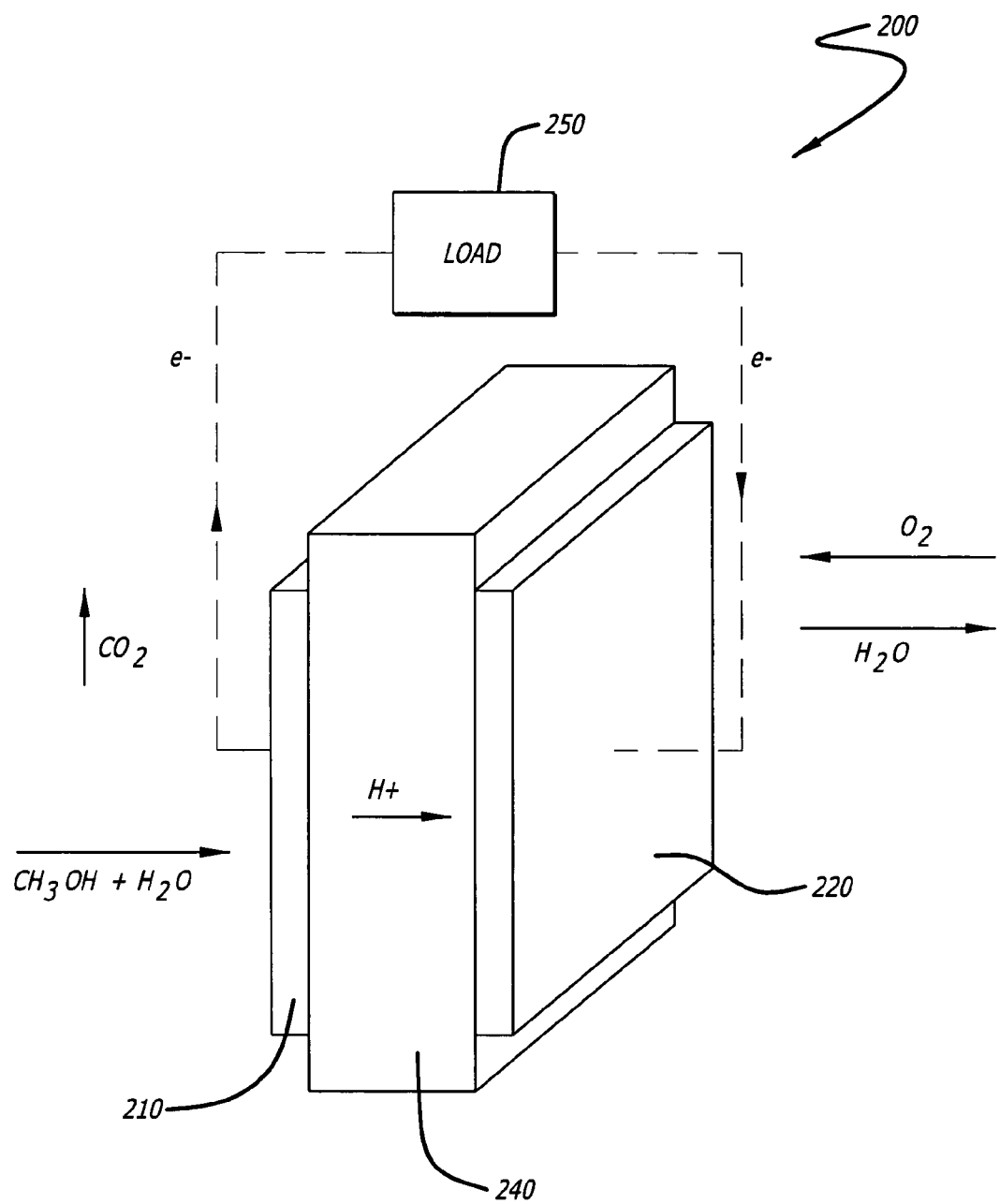
FIG. 2 depicts a schematic of a membrane electrode assembly for a direct methanol fuel cell.

Referring to FIG. 2, a direct methanol fuel cell 200 of the present invention includes an anode 210, cathode 220 and a polymer electrolyte membrane (PEM) 240 positioned between the anode and cathode. A methanol ($CH_3OH$) in water ($H_2O$) solution is introduced at the anode, which releases carbon dioxide ($CO_2$) during methanol oxidation catalyzed by platinum (or other material) contained in the anode. Air or oxygen ($O_2$) is introduced at the cathode, and water is formed during oxygen reduction (catalyzed by platinum or other material) as protons (H+) move across the membrane. A load 250 connected across the anode and cathode completes the electric circuit formed by electrons (e−) released during methanol oxidation.

Figure 3:
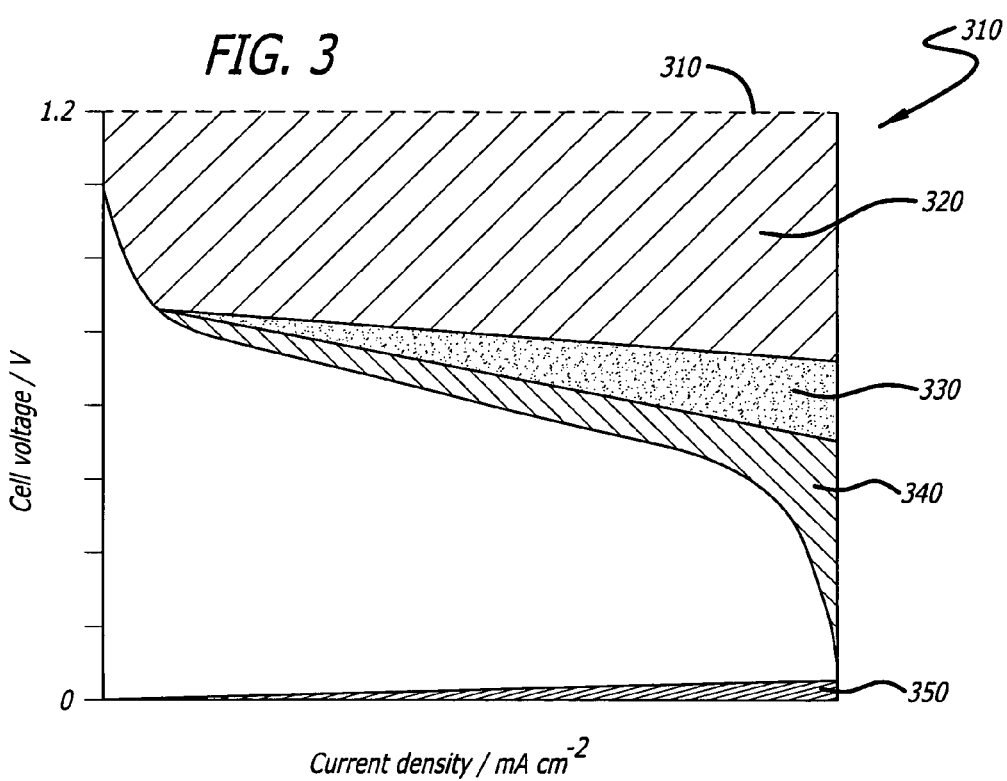
FIG. 3 is a typical fuel cell ($H_2$) polarization curve.

As shown in FIG. 3, a fuel cell polarization curve (I-V) 310 has an uppermost horizontal theoretical curve 310 with certain associated loses in efficiency. For example, there is a significant cathode kinetic loss 320 and a somewhat smaller anode kinetic loss 350. In addition, there is an internal resistance loss 330 and a mass transport loss 340. PEMFCs also exhibit a significant cathode over-potential loss, while DMFCs exhibit significant anode over-potential loss.

Figure 4:
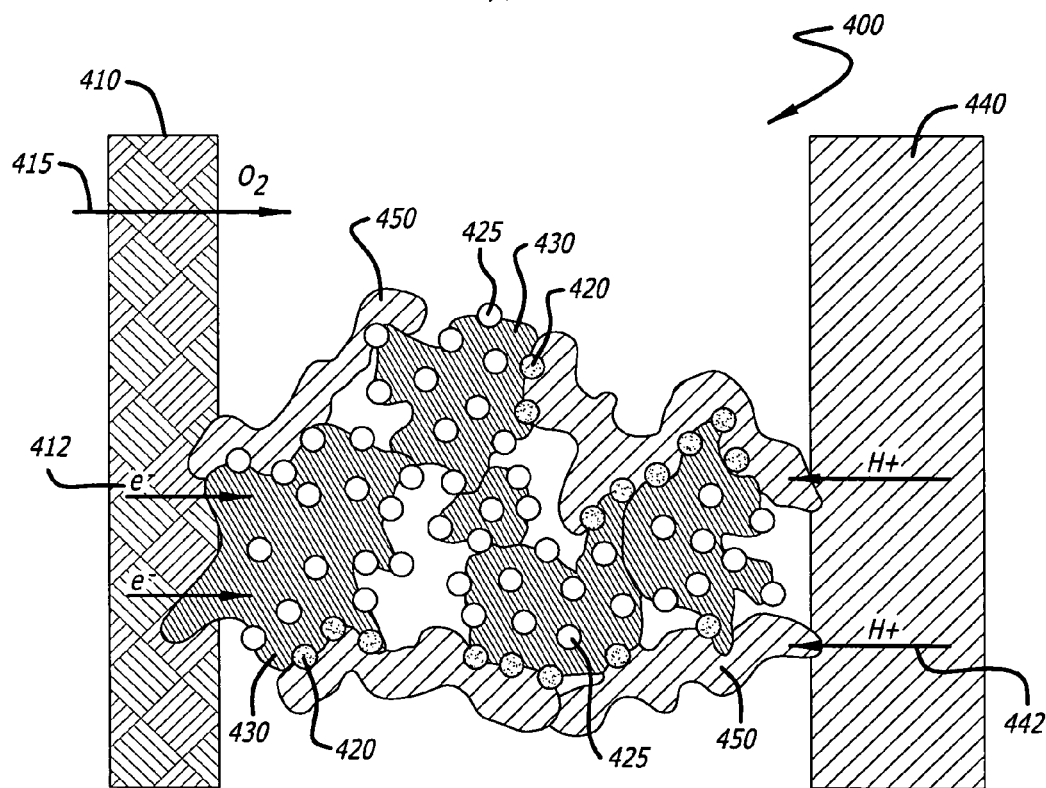
FIG. 4 is a schematic diagram of a catalyst having platinum disposed on carbon black and NAFION polymer electrolyte.
Figure 5:
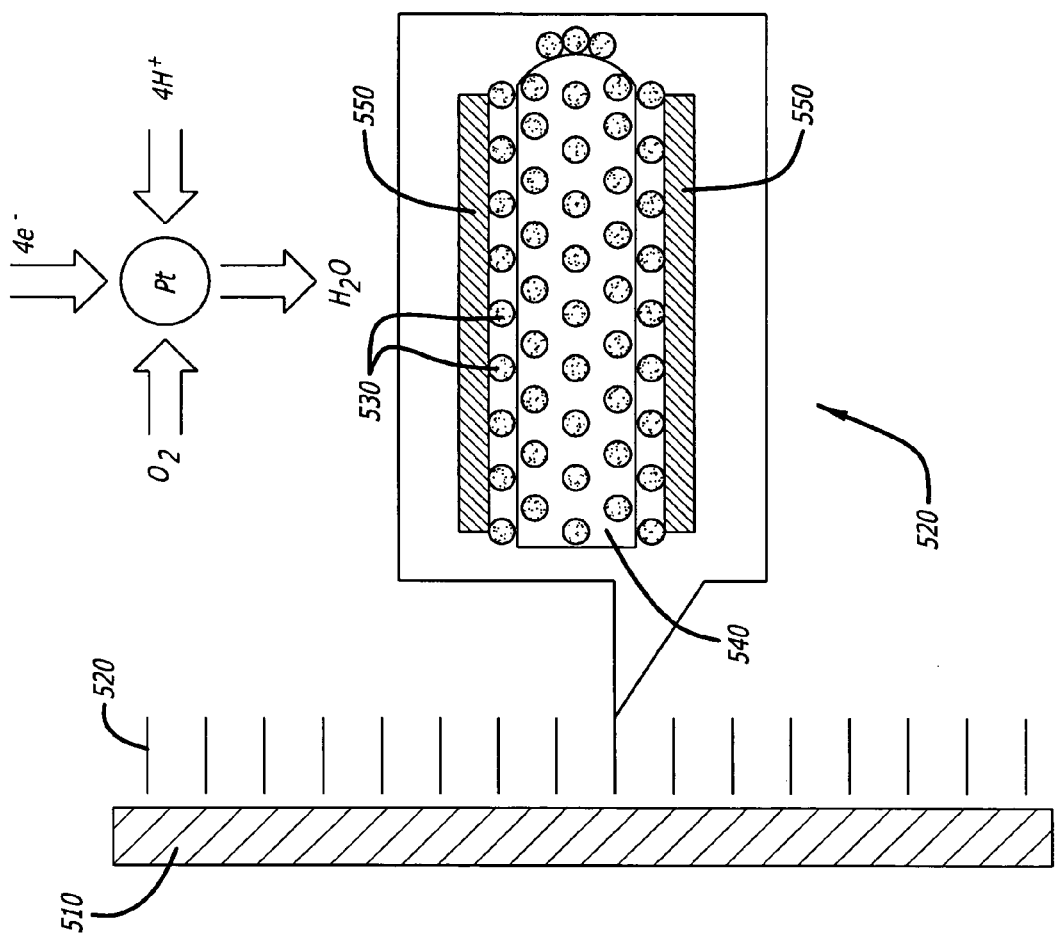
FIG. 5 depicts a schematic of platinum containing carbon nanotubes oriented on a film.
Figure 6:
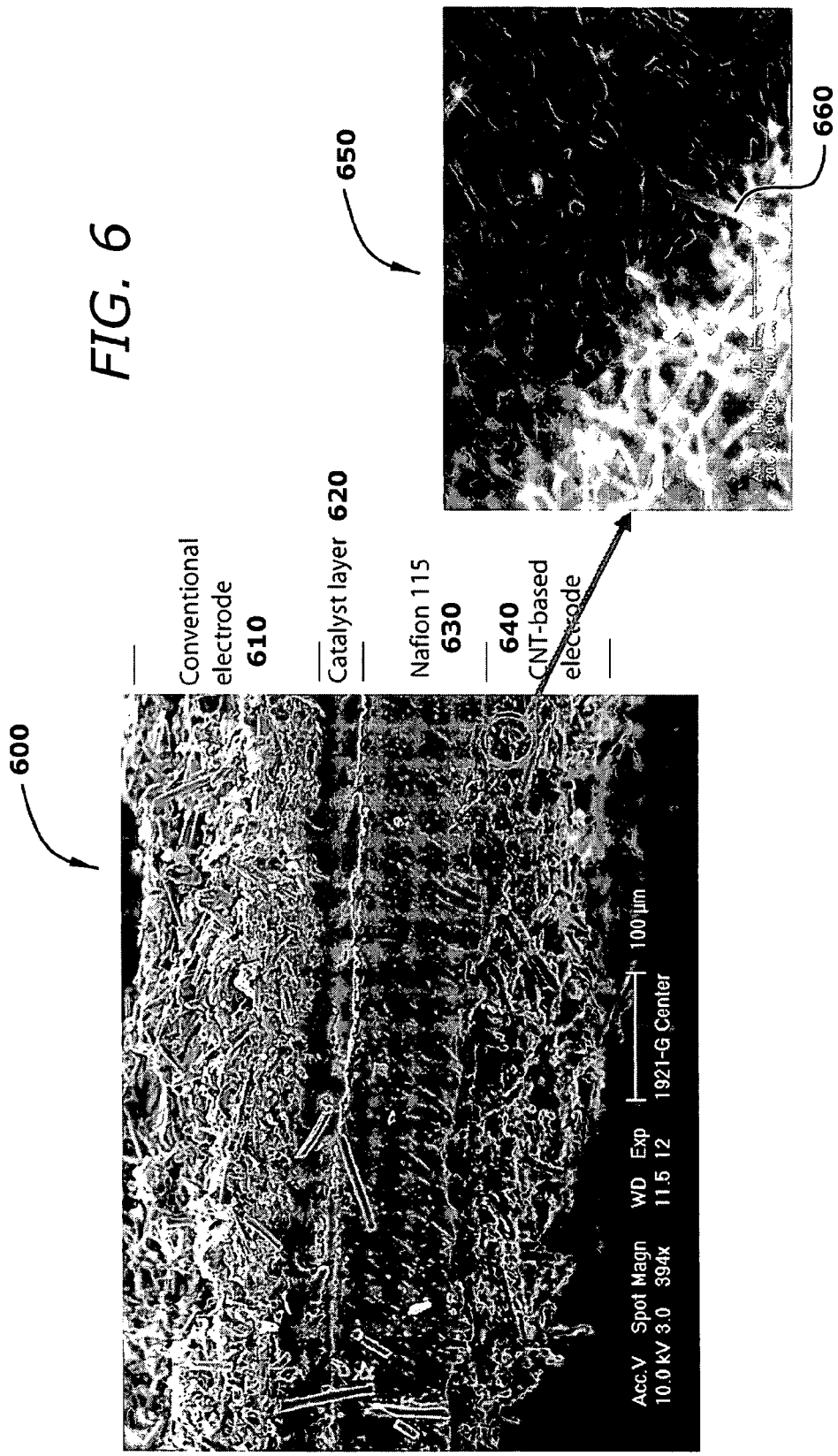
FIG. 6 is an SEM of a membrane electrode assembly having a carbon nanotube based electrode.

Referring to FIG. 4, the most commonly used electrode catalyst 400 is platinum (Pt) 420, 425 supported on carbon fibers 410. One of the challenges in the commercialization of PEMFCs and DMFCs is the high cost of noble metals used as catalyst (e.g., platinum). Decreasing the amount of platinum used in a fuel cell electrode via the increase of the utilization efficiency of platinum has been one of the major concerns during the past decade. To effectively utilize the platinum catalyst, the platinum should have simultaneous access to the gas, the electron-conducting medium, and the proton-conducting medium. In the catalyst layer of a platinum-based conventional fuel cell prepared by the ink-process, the simultaneous access of the platinum particle 420 by the electron-conducting medium and the proton-conducting medium is achieved via a skillful blending of platinum supporting carbon black particles 430 and the solubilized perfluorosulfonate ionomer (e.g., NAFION) 450. The carbon particles conduct electrons and the perfluorosulfonate ionomer (e.g., NAFION) conduct protons.

Even with the most advanced conventional electrodes, there is still a significant portion of platinum 425 that is isolated from the external circuit and/or the proton exchange membrane (PEM) 440, resulting in a low platinum utilization. For example, platinum utilization in current commercially offered prototype fuel cells remains very low (20-30%) although higher utilization has been achieved in laboratory devices. Efforts directed at improving the utilization efficiency of the platinum catalyst have focused on finding the optimum material configurations while minimizing the platinum loading and satisfying the requirements of gas access, proton access, and electronic continuity. In the conventional ink-process, a common problem has been that the necessary addition of the solubilized perfluorosulfonate ionomer (e.g., NAFION from Ion Power, Inc.) for proton transport tends to isolate carbon particles in the catalyst layer, leading to poor electron transport.

Due to their unique structural, mechanical, and electrical properties, carbon nanotubes may be used to replace traditional carbon powders in PEMFCs and have been demonstrated by making membrane electrode assemblies (MEA) using carbon nanotube powders through a conventional ink process. The use of carbon nanotubes and the resulting guaranteed electronic pathway eliminate the previously mentioned problem with conventional PEMFC strategies where the proton-conducting medium (e.g., NAFION) would isolate the carbon particles in the electrode layer. Eliminating the isolation of the carbon particles supporting the electrode layer improves the utilization rate of platinum.

Referring to FIG. 9A-9D, there are two categories of carbon nanotubes: single-walled nanotubes (SWNTs) and multi-walled nanotubes (MWNTs). A SWNT (FIG. 9A) is a single graphene sheet rolled into a cylinder. A MWNT (FIG. 9C) is comprised of several coaxially arranged graphene sheets rolled into a cylinder. One subset of MWNTs is dual-walled carbon nanotubes (DWNT) (FIG. 9B) that are formed from coaxially arranged graphene sheets rolled into a cylinder. According to theoretical predictions, SWNTs can be either metallic or semiconducting depending on the tube diameter and helicity. The band gap is proportional to the reciprocal diameter, 1/d. For MWNTs, scanning tunneling spectroscopy (STS) measurements indicate that the conduction is mainly due to the outer shell, which are usually much larger than SWNTs. Therefore, MWNTs have a relatively high electrical conductivity. And, it is preferred that MWNTs be the support for the platinum catalyst in PEMFCs because of their relatively high electrical conductivity and because current growth methods for MWNTs are simpler than those for SWNTs.

Figure 9A:
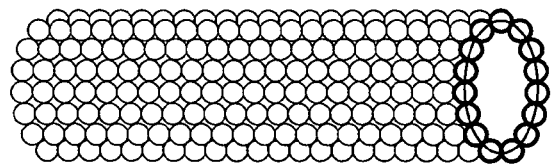
FIGS. 9A-9D are schematic representations of various carbon nanotubes.
Figure 9B:
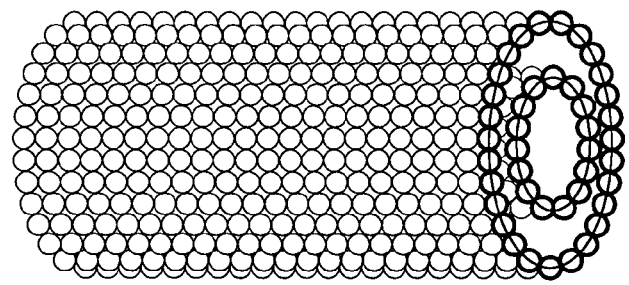
Figure 9C:
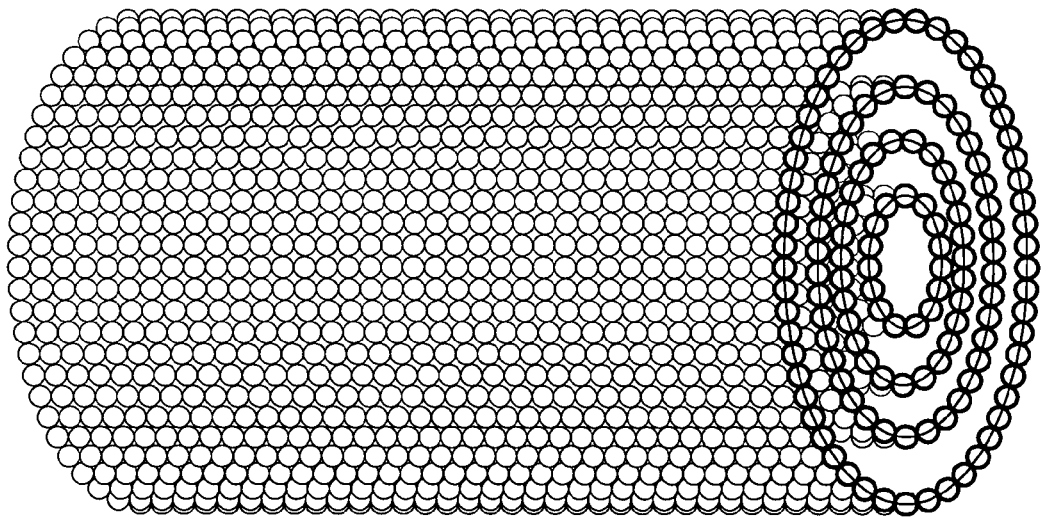
Figure 9D:
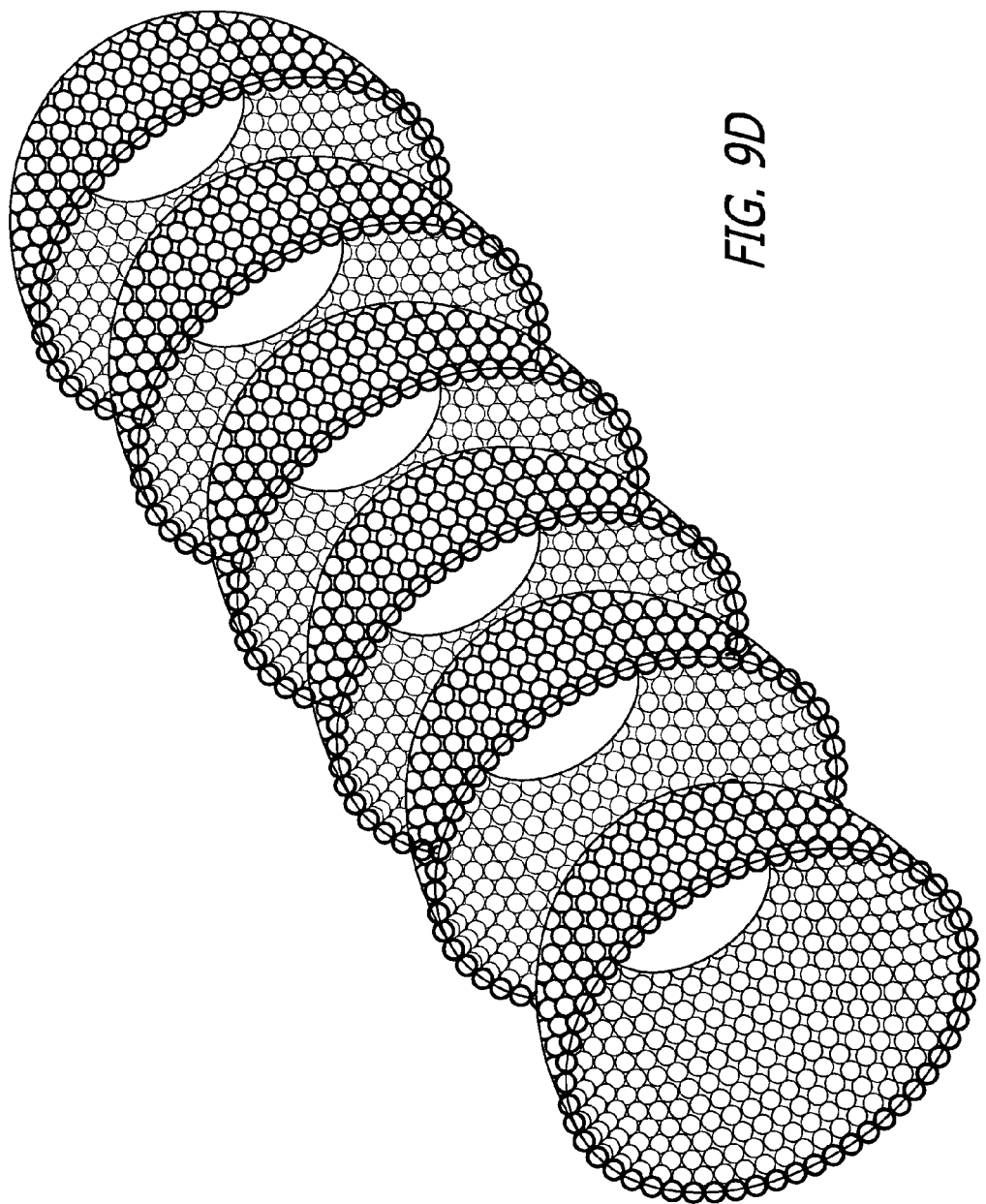

Additional carbon nanomaterials for use in the electrocatalyst of the present invention include, but are not limited to, nanofibers and cup-stacked carbon nanotubes (CS-CNT), also referred to as "stacked-cup" carbon nanotubes. Nanofibers are essentially carbon nanomaterials placed end-to-end. Cup-stacked carbon nanotubes are an end-to-end collection of open-ended conical (frustum) cups, wherein each cup is a single layer of graphene like graphite (FIG. 9D).

Figure 7:
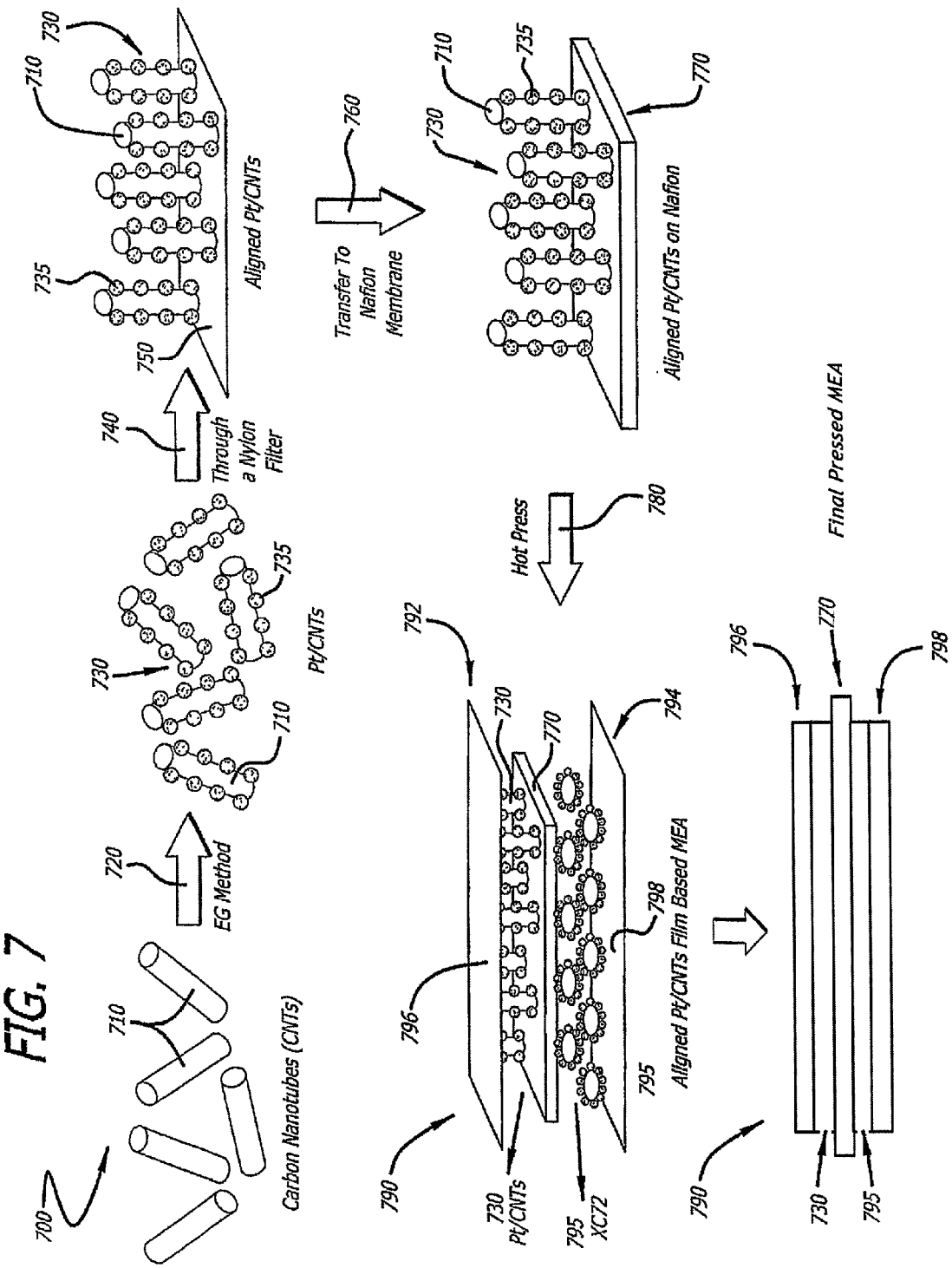
FIG. 7 is a schematic representation of the method of preparing a membrane electrode assembly for a cathode for a PMFC.

Referring now to FIG. 7, the PEMFC process 700 of the present invention includes depositing platinum 735 on carbon nanotubes 710 to form the catalyst 730 using ethylene glycol (EG) in the reduction process 720. The platinum carbon nanotubes for the use in the cathode 792 are formed by filtering 740 the carbon nanotubes onto Nylon or other suitable filter substrate 750. The oriented (aligned) carbon nanotubes are dried and then transferred 760 onto a proton exchange membrane (PEM) 770. A cathode diffusion layer 796 is positioned on the outside of the platinum carbon nanotubes. A membrane electrode assembly (MEA) 790 is formed by sandwiching the anode catalyst 795 (e.g., Pt/XC72) between the PEM and an anode diffusion layer 798 that form the anode 794. The MEA is hot pressed 780 to form an integrated unit, wherein heat and pressure are used to seal the first gas diffusion layer, the first catalyst layer coated membrane, the second catalyst coated second gas diffusion layer together to produce the membrane electrode assembly.

The present invention includes a filtration process for forming membrane electrode assembly films having carbon-based nanomaterials (for brevity, the process is described for carbon nanotubes, but is applicable to carbon nanofibers and stacked-cupped nanotubes). Carbon nanotubes (CNTs) have been studied as an electrocatalyst support for proton-exchange membrane fuel cells and direct methanol fuel cells. Some early investigations found that by using the normal paste method and simply replacing carbon black particles with disordered multi-walled CNTs as the support for platinum (Pt) catalyst nanoparticles higher PEMFC and DMFC performances were achieved. There was also an effort to form a single-walled carbon nanotube (SWNT) film via the electrophoretic method for studying the effect of SWNTs as a catalyst support in fuel cells.

It is believed that an oriented CNT film may offer much improved fuel cell performance over that of disordered CNTs because of its unique microstructure. First, the electronic conductivity of CNTs is much higher along the tubes than across the tubes, and there is no energy loss when electrons transfer along the tubes. Second, higher gas permeability is expected with the oriented CNT film. Third, an oriented film may also exhibit super-hydrophobicity, which can greatly facilitate water removal within the electrode, thereby improving mass transport in a PEMFC or DMFC.

Aligned multi-walled carbon nanotube (MWNTs) film have been grown directly on a carbon paper substrate by the chemical vapor deposition (CVD) method with subsequent deposition of platinum nanoparticles on the MWNTs to form the composite electrode. An advantage of the CVD approach is that the deposited platinum nanoparticles are almost guaranteed to be in electrical contact with the external circuit and much improved platinum utilization (e.g., sixty percent) has been achieved. With the aforementioned direct CVD method, however, it has been difficult thus far to prepare platinum catalyst nanoparticles with a uniform small diameter (e.g., less than five nanometers) at high platinum loading (e.g., thirty wt %), two critical properties of a high-performance electrocatalyst. Also, it has been found that it is difficult to grow an aligned CNT film directly on carbon paper by the CVD method because of the rough nature of the carbon paper. In addition, although the CVD process is well suited to the fabrication of micro fuel cells, the process is expensive to scale up if films with large areas (e.g., hundreds of $cm^2$) are desired.

Figure 10A:
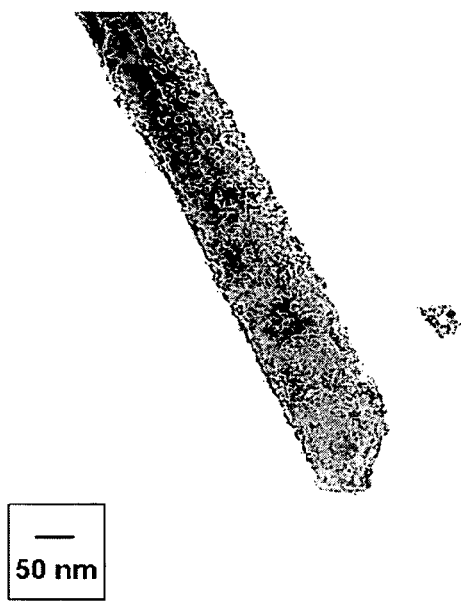
FIGS. 10A-10C are TEMs of various carbon nanotubes.
Figure 10B:
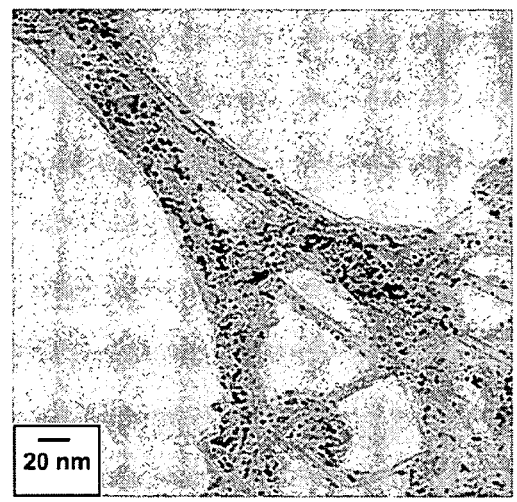
Figure 10C:
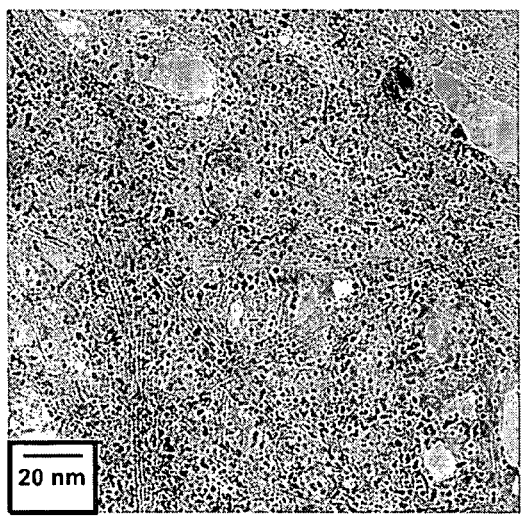
Figure 11:
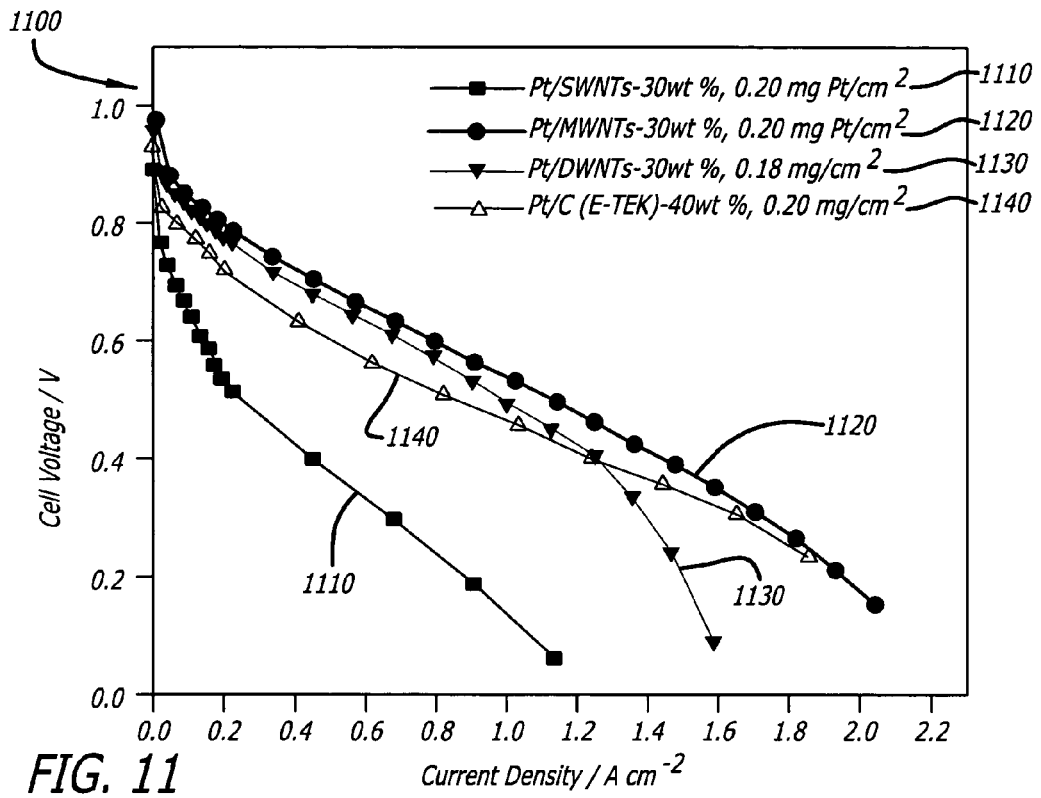
FIG. 11 depicts PEMFC polarization curves for various platinum carbon nanotubes.
Figure 12:
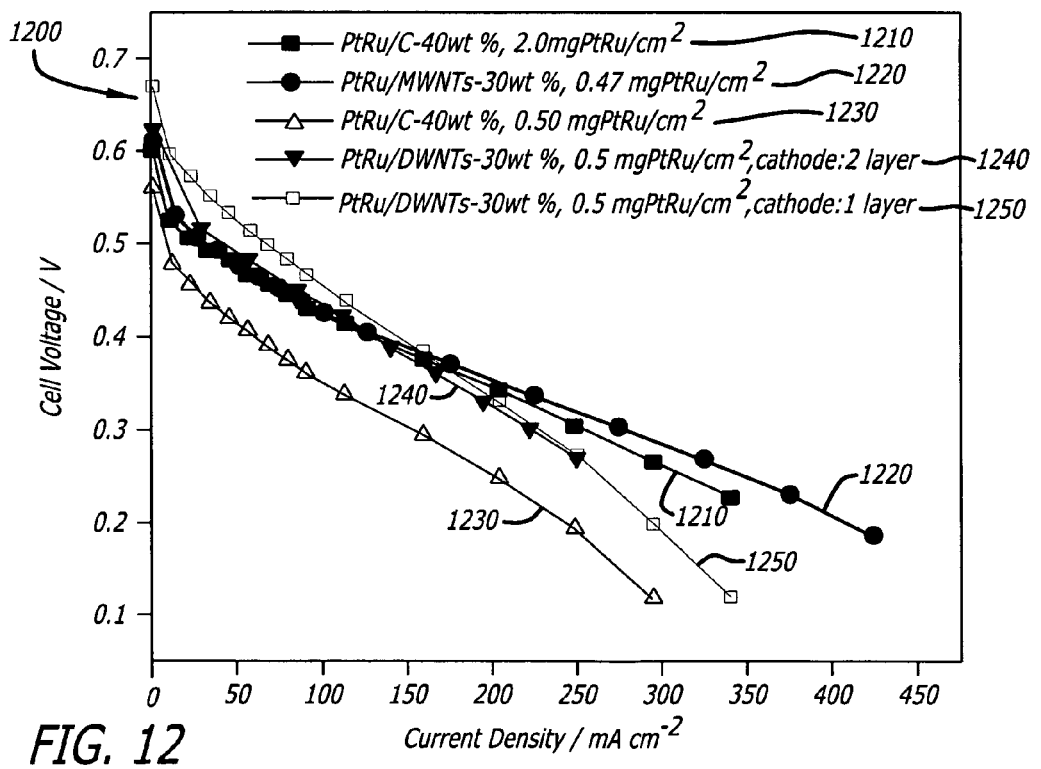
FIG. 12 depicts DMFC polarization curves for various platinum-ruthenium (PtRu) carbon nanotubes.
Figure 13:
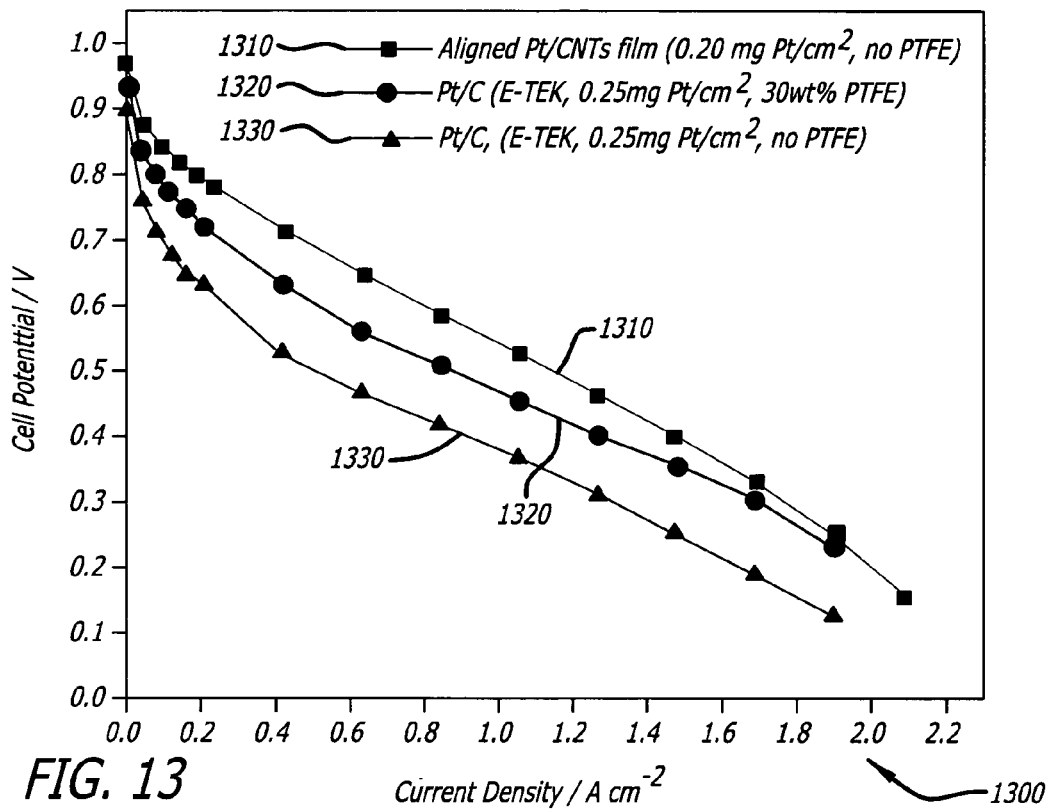
FIG. 13 depicts PEMFC polarization curves of aligned multi-walled carbon nanotubes having PTFE.

In accordance with the present invention, a simple, versatile, and inexpensive filtration method for the preparation of an oriented Pt/CNT film for PEMFCs (FIG. 7) has been developed. In contrast to previous efforts where platinum nanoparticles were deposited after the CNT film was formed, the method of the present invention included depositing the platinum (or Pt/Ru) catalyst nanoparticles on the CNTs before the film formation (FIGS. 10A-10C). Filtration was used as a vehicle to form an oriented film of Pt/CNT on the NAFION membrane, which is then used as the catalyst layer in the fabrication of the membrane electrode assembly (MEA) for PEMFC. The method is simple, convenient, and easy to scale up. This approach of the present invention takes advantage of all of the known methods for depositing metal (e.g., platinum) nanoparticles on the CNTs with precise control on the particle size, distribution, and loading. It also offers a convenient method of preparing alloy electrocatalysts, such as PtRu/CNT, PtNi/CNT, and PtSn/CNT.

In accordance with the method of the present invention, ethylene glycol (EG) was used as a reducing agent and solvent to prepare platinum supported on the CNTs with a high metal loading (thirty weight percent platinum). The Pt/CNT suspension was then filtered through 0.2 μm-pore hydrophilic nylon filter paper. Because the nylon filter is hydrophilic and the CNTs are hydrophobic, the CNTs tend to "stand up" on the filter and self-assemble into an oriented film. The deposited film was then transferred onto a perfluorosulfonate ionomer (NAFION) membrane by pressing the CNT-coated side of the filter onto the NAFION membrane. After the transfer, a five weight percent solubilized perfluorosulfonate ionomer (NAFION) solution was sprayed onto the surface of the Pt/CNT film (1.0 mg dry NAFION/cm$^2$) to complete the cathode preparation. Finally, the anode, the oriented Pt/CNT-film-coated NAFION membrane, and a gas diffusion layer were hot pressed to obtain a membrane electrode assembly (MEA) with the oriented Pt/CNT film serving as the cathode catalyst layer. A carbon black-based E-TEK electrode was used as the anode.

Suitable CNTs for use in the filtration method of the present invention include commercial products synthesized by the CVD method (for example, multi-walled carbon nanotubes available from Material & Electrochemical Research Corp.). To achieve a uniform platinum deposition on the outer walls of the nanotubes, the CNTs were surface oxidized by a 2.0 M $H_2SO_4$/4.0 M $HNO_3$ mixture for six hours under refluxing conditions. The oxidized and washed CNTs were then suspended in ethylene glycol solution and mixed with hexachloroplatinic acid in ethylene glycol solution. After adjusting the pH of the solution to above thirteen with 1.0 M NaOH in ethylene glycol, the mixture was held at 140° C. for three hours under reflux conditions to reduce the platinum. After filtration, washing, and drying, a Pt/CNT catalyst metal loading of thirty weight percent (wt %) was obtained.

For MEA preparation, both the anode and cathode include a carbon paper backing layer, a gas diffusion layer, and a catalyst layer. Carbon papers (available from Toray Corp.) treated with PTFE (ten wt % PTFE in the cathode and anode) were employed as the backing layers. To prepare the diffusion layer, five weight percent PTFE solution and carbon black XC-72 (available from Cabot Corp.) (weight ratio of carbon black to pure PTFE—7:3) were mixed in ethanol by ultrasonication, and then the slurry was sprayed onto the carbon paper as a gas diffusion layer with a carbon (C) loading of about four mg/cm$^2$ in both the anode and cathode. The anode catalyst layer includes two layers. The first layer has a platinum electrode area loading of 0.1 mg Pt/cm$^2$ (twenty wt % Pt/C, E-TEK). It consists of a seventy weight percent Pt/C catalyst and thirty weight percent PTFE. The second layer also has a platinum electrode area loading of 0.1 mg Pt/cm$^2$ (twenty wt % Pt/C, E-TEK), but it is composed of seventy wt % Pt/C catalyst and thirty weight percent NAFION (not PTFE). A five weight percent NAFION solution was finally sprayed onto the surface of the anode (1.0 mg NAFION/cm$^2$) to form a thin NAFION layer. The MEA was obtained by hot pressing the anode, an oriented Pt/CNT-coated NAFION membrane, and a cathode gas diffusion/backing layer with a pressure of 140 atmospheres (atm) at 135° C. for 1.5 minutes.

For comparison, two other cathode catalyst layers were prepared. One was prepared by mixing twenty weight percent Pt/C E-TEK catalyst with PTFE solution (weight ratio of Pt/C to pure PTFE—7:3) and depositing the mixture onto the gas diffusion layer. The other was prepared by just spraying thirty weight percent Pt/CNT catalyst onto the gas diffusion layer. Both cathode layers were sprayed with NAFION with a 1.0 mg/cm$^2$ loading. The platinum loading of the cathodes was 0.2 or 0.25 milligrams (mg) of Pt/cm$^2$. The single-cell performance of the five square centimeters (cm$^2$) MEAs was conducted using an automated fuel cell test station.

Figure 20A:
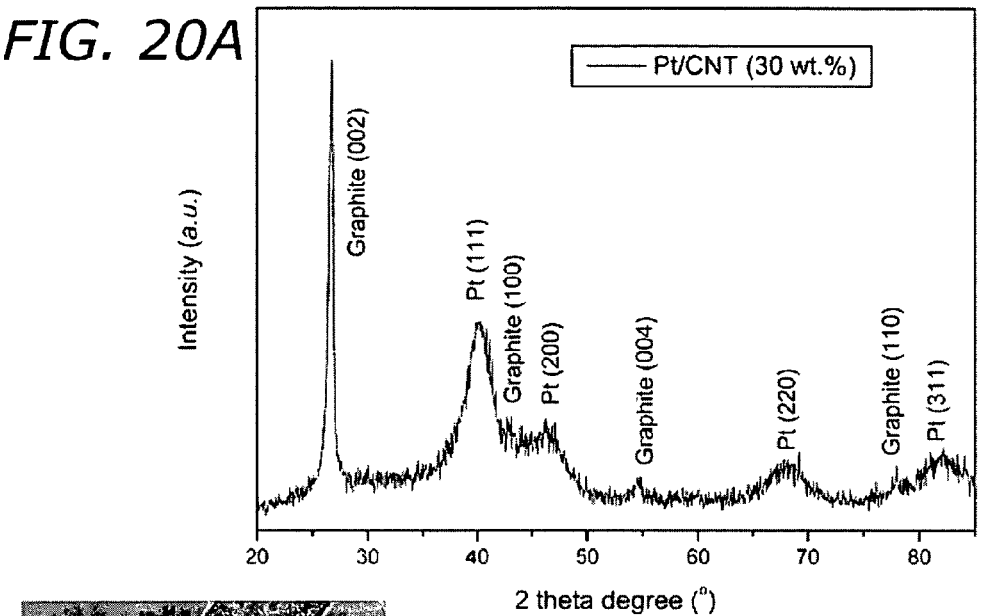
FIG. 20A is a powder XRD pattern for platinum carbon nanotube catalysts.
Figure 20B:
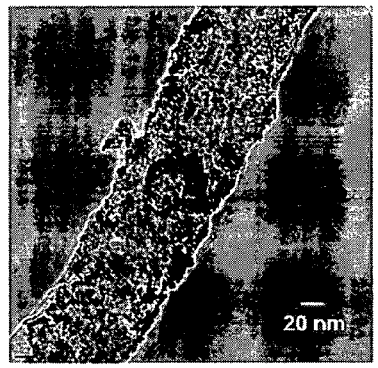
FIG. 20B is a TEM of a platinum carbon nanotube catalysts.

The x-ray diffraction (XRD) pattern (Bruker αXS, D8ADVANCE) of the Pt/CNT sample is shown in FIG. 20A. The diffraction peak observed at 23-27° can be attributed to the hexagonal graphite structure (002), which shows that CNTs have good electric conductivity. The platinum diffraction peaks show that platinum has a face-centered cubic (fcc) crystal structure. From the isolated platinum (220) peak, the mean particle size calculated with the Scherrer equation is 2.6 nanometers (nm). A typical transmission electron microscopy (TEM, Philips TECNI12) image of 30 wt % Pt/CNT (FIG. 20B) shows that spherical platinum nanoparticles with a narrow size distribution (2-5 nm and averaged at 2.8 nm) have been deposited on the CNTs, which is consistent with the XRD analysis. Considering the fact that multiwalled CNTs have a relatively small surface area (100 m$^2$/g) compared with that of carbon black (237 m$^2$/g), it is interesting that a small platinum particle size can still be obtained with this method at such a high metal loading (30 wt %).

Figure 20C:
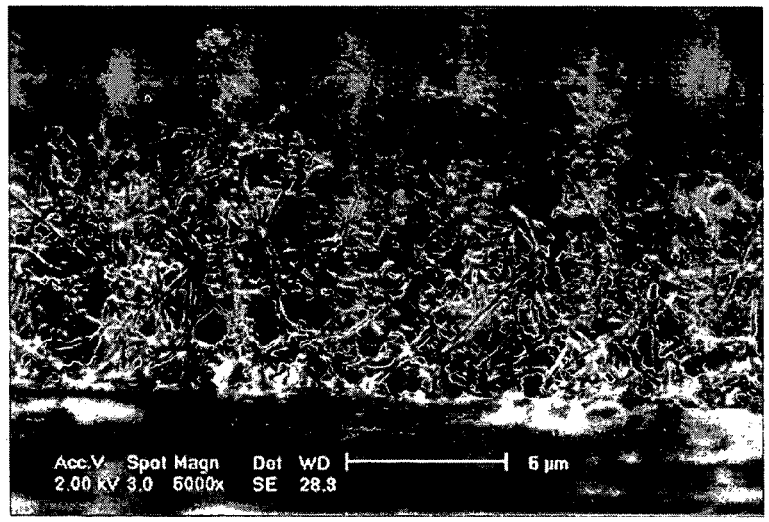
FIG. 20C is a SEM of oriented carbon nanotubes containing platinum.
Figure 21:
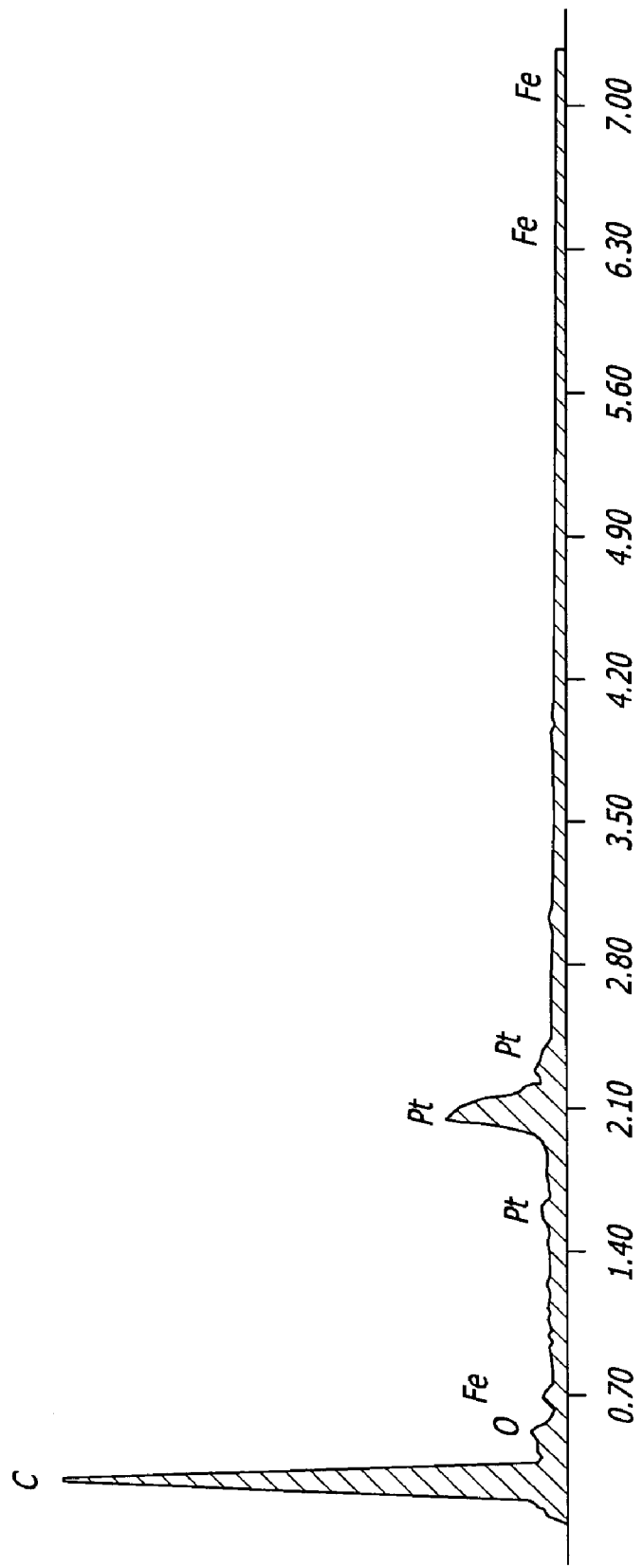
FIG. 21 is an elemental analysis plot of a platinum carbon nanotube.

The scanning electron microscopy (SEM, Philips XL30-FEG) image of the cross section of the Pt/CNT-film-coated NAFION membrane (FIG. 20C) shows a thin film of about five μm thickness on the NAFION membrane. Most CNTs are standing up, although they are not fully vertical to the membrane. As those of ordinary skill in the art may appreciate a CNT film with enhanced orientation can be obtained with further optimization of the filtration process. An elemental analysis is shown in FIG. 21.

Figure 15C:
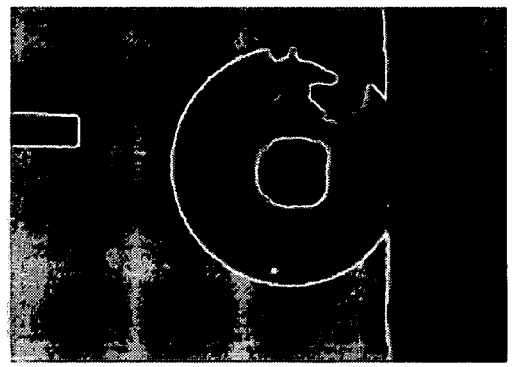
FIGS. 15A-15C are SEMs of various surface contact angles.
Figure 15B:
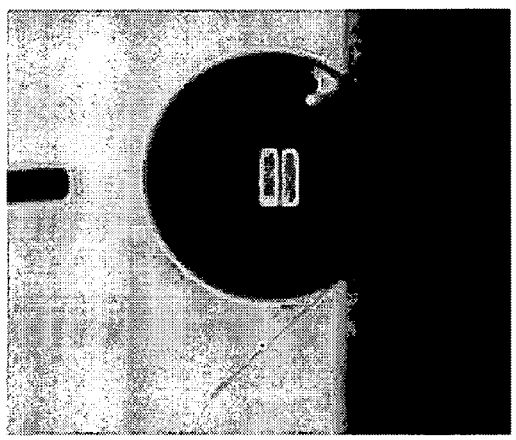
Figure 15A:
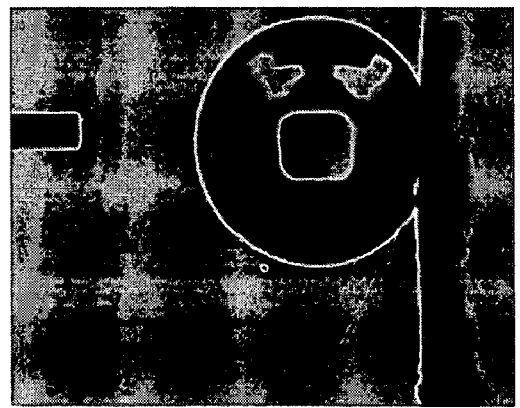

The contact angles (CA) of the oriented Pt/CNT film (FIG. 15A) and the non-oriented Pt/CNT film (FIG. 15B) (spraying Pt/CNT onto the cathode diffusion layer directly and without PTFE) are 151.7° and 134.2°, respectively. It is interesting that large contact angles are obtained even though these CNTs have been treated with a mixture of nitric acid and sulfuric acid before the platinum deposition. Apparently, hydrophilic functional groups (e.g., —COOH) were generated during the acid reflux process but may have been subsequently used for anchoring platinum nanoparticles. It has been reported that an oriented pristine CNT film shows higher hydrophobicity than a non-oriented one. The contact angle measurements show that the Pt/CNT film prepared by the filtration method is more hydrophobic probably because its orientation is better than that of the Pt/CNT film formed by the spaying method. The catalyst layer with seventy weight percent Pt/C and thirty weight percent PTFE offers a contact angle of only 147.2° (FIG. 15C), which is lower than that of the oriented Pt/CNT film without any PTFE. In a fuel cell electrode, PTFE is commonly added to serve as a binder and to provide hydrophobicity for water management within the electrode structure. However, the PTFE added to the electrode often covers the platinum catalytic sites, thus lowering the activity of the platinum catalyst. Furthermore, the use of PTFE requires sintering at high temperatures (e.g., 340° C.), which tends to lead to the aggregation of platinum particles. Thus, the elimination of PTFE without sacrificing hydrophobicity and electrode integrity can be beneficial to the maximization of platinum utilization.

Figure 14:
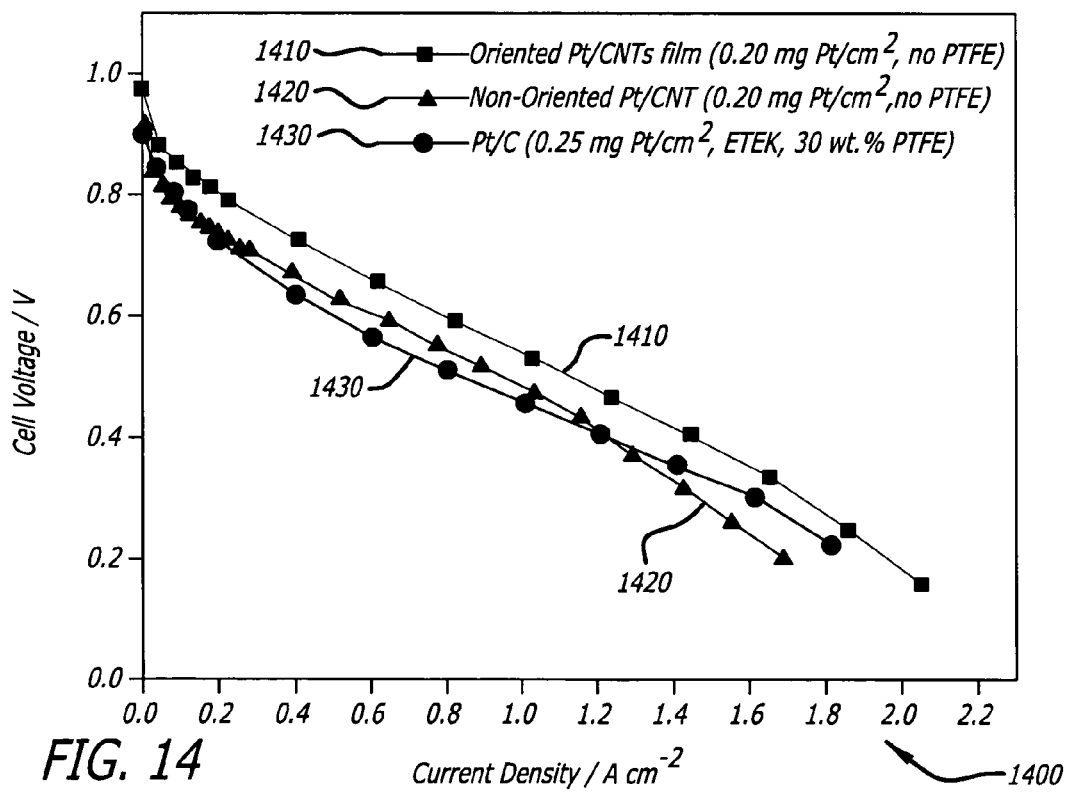
FIG. 14 depicts PEMFC I-V curves of oriented single-walled carbon nanotubes having PTFE.

The polarization curves of the membrane electrode assembly (MEA) based on oriented Pt/CNT, non-oriented Pt/CNT, and Pt/C (with thirty wt % PTFE) as the cathode catalyst layers are shown in FIGS. 11-14. As shown in FIG. 14, oriented Pt/CNT based MEA exhibits higher performance than Pt/C and non-oriented Pt/CNT based MEAs. Higher performance in the activation-controlled region (low current density) may be attributed to the enhanced specific activity of platinum due to the unique interaction of platinum and CNT. The elimination of the electronically insulating PTFE and the possibly improved electron transfer through the oriented CNTs in the oriented Pt/CNT catalyst layer may help to improve platinum utilization and reduce the ohmic resistance of the electrode, which can provide improved performance over the whole current density range. At the mass transfer controlled region (high current density), the super-hydrophobicity of the oriented Pt/CNT film can help to repel water from the cathode, whereas the MEAs with non-oriented Pt/CNTs and Pt/C show lower performance that is mainly due to "flooding" of the electrode and the resulting mass transport difficulty. Careful optimization of the structure of the oriented CNT film (e.g., CNT alignment, film thickness, NAFION content, etc.) is likely to improve further the power density of the fuel cell.

The filtration method of the present invention demonstrates a simple, fast, inexpensive, and scalable filtration method of preparing a partially oriented super-hydrophobic CNT film via self-assembly of CNTs that have been pre-catalyzed with small platinum nanoparticles (2.8 nm) at high metal loading (thirty wt %). When such a film is used as the cathode, higher PEMFC performance is achieved because of improved platinum utilization and mass transport. This method can be easily extended to the preparation of oriented CNT supported bimetallic electrocatalysts such as PtRu, PtNi, and PtSn, which are useful for both PEMFCs and DMFCs.

Referring now to FIG. 8, the DMFC process 800 of the present invention includes depositing platinum-ruthenium 835 on carbon nanotubes 810 to form the catalyst 830 using ethylene glycol (EG) in the reduction process 820. The platinum-ruthenium carbon nanotubes for the use in the anode 892 are formed by adding (spraying) NAFION and filtering 840 the carbon nanotubes onto Nylon or other suitable filter substrate 850. The oriented (aligned) carbon nanotubes are dried and then transferred 860 onto a proton exchange membrane (PEM) 870. An anode diffusion layer 896 is positioned on the outside of the platinum-ruthenium carbon nanotubes. A membrane electrode assembly (MEA) 890 is formed by sandwiching the cathode catalyst 895 (e.g., Pt/XC72) between the PEM and a cathode diffusion layer 898 that form the anode 894. The MEA is hot pressed 880 to form an integrated unit, wherein heat and pressure are used to seal the first gas diffusion layer, the first catalyst layer coated membrane, the second catalyst coated second gas diffusion layer together to produce the membrane electrode assembly.

Multi-walled carbon nanotubes (MWNTs) were purchased from the MER Corp., which were produced by chemical vapor deposition (CVD). The MWNTs have a diameter of 80 to 120 nanometers (nm) and surface area of approximately 100 $m^2$/g. Dual-walled carbon nanotubes (DWNTs) were purchased from NANOCYL S.A. and were also produced by CVD. The diameters of the DWNTs range from 1.5 to 2 nm (bundled at 4 to 10 nm) and their surface area is about 500 $m^2$/g. The highly purified SWNTs were self-prepared by an arc-discharge method, and the bundled diameter is 4 to 10 nm and their surface area is also about 500 $m^2$/g. All the CNTs in the experiments were surface oxidized by a 4.0 $NH_2SO_4$—$HNO_3$ mixture for 6 hours under refluxing condition.

Pt—Ru/CNT catalysts were prepared by an ethylene glycol (EG) reduction method. The preparation method is briefly described below using MWNTs as a typical example. The surface oxidized MWNTs (200 mg) were suspended in an EG solution and treated in an ultrasonic bath. Then an EG solution of hexachloroplatinic acid and ruthenium chloride was added drop wise, under mechanically stirred conditions for 4 hours. A solution of 1.0 M NaOH in EG was added to adjust the pH of the synthesis solution to above 13, and then the mixture was heated at 140° C. for 3 hours to reduce the Pt—Ru completely. The entire EG solution has a deionized (DI) water content of five volume percent (vol %). A condenser was used in order to keep the water content constant in the synthesis system and the whole preparation process was conducted under flowing argon. After filtration (Whatman, Grade 1), washing, and drying in vacuum at 80° C. for 8 hours, the Pt—Ru/CNT catalyst was obtained. The filtrated solvent was clear with a light yellow color and the weight calculation showed the Pt—Ru conversion was nearly 100% during the deposition process. We prepared 30 wt % Pt—Ru/CNT catalyst for MWNTs, DWNTs, and SWNTs, and a 50 wt % Pt—Ru/DWNT catalyst. The 40 wt % Pt—Ru/C catalyst was kindly provided by E-TEK and used as a control sample.

Pt—Ru/CNT powders were characterized by X-ray diffraction (XRD) using Cu-K$\alpha$ radiation with a Ni filter. The tube current was 40 mA with a tube voltage of 40 kV. The 2$\kappa$ regions between 20° to 85° were explored at a scan rate of 5°/min. Transmission electron microscopy (TEM) was carried out on a PHILIPS S3000 operating at 300 keV. Scanning electron microscopy (SEM) was conducted on a PHILIPS XL30-FEG with an operating voltage of 10 or 15 kV.

The methanol oxidation reaction activity of the Pt—Ru/CNT catalyst was conducted in a rotating disk electrode (RDE) setup using an Ag/AgCl reference electrode, and a platinum wire counter electrode. The RDE working electrode was prepared as follows. A mixture containing 7.6 mg Pt—Ru/CNT catalyst and 2.0 mL ethanol was ultrasonically blended in a glass vessel for half an hour to obtain a homogeneous ink. Twenty µL of ink was spread with a micropipette on the surface of a glassy carbon electrode (Pine Instrument, 5 mm in diameter) and dried for 10 minutes. The 10 µL NAFION solution (5 wt %) was dropped onto the surface of the thin catalytic layer. The electrolyte was 0.5 M $H_2SO_4$ solution. The cyclic voltammetry (CV) tests were obtained after nitrogen bubbling for 10 minutes. The scan range was from −0.3 V to 0.8 V and the scan increment was ten mV/s.

For a DMFC membrane electrode assembly (MEA), both the anode and the cathode consist of a backing layer, a gas diffusion layer, and a catalyst layer. Teflonized (30 wt % TEFLON (PTFE) in the cathode and 10 wt % in the anode) carbon papers (Toray Corp.) were employed as backing layers in these electrodes. Then an ethanol suspension with 20 wt % Teflon and 80 wt % Vulcan XC-72 was agitated in an ultrasonic water bath, and then spread on the cathode backing layer to prepare the cathode gas diffusion layers. The anode diffusion layer was similarly prepared, but 20 wt % NAFION was used in place of 20 wt % Teflon.

For the anode catalyst layer fabrication, we used a modified filtration method to make a compact Pt—Ru/CNT film. The schematic illustration of the fabrication process is described in FIG. 8. A Pt—Ru/CNT suspension in ethanol with known solid loading was drawn through a 0.2-μm-pore hydrophilic Nylon filter paper. To incorporate NAFION into the catalyst layer, the suspension was divided into five equal portions and the filtration was carried out five times. After each filtration, a 20 wt % NAFION solution was spayed on the surface of the filtrated Pt—Ru/CNT solid. Then the final deposited layer on the filter paper was transferred onto NAFION membrane directly, by hot pressing the CNT coated side of the filter onto the ionic membrane to produce a catalyst coated NAFION membrane (CCM).

The cathode catalyst layer includes two layers. The first layer is 1.0 mg Pt/cm$^2$ (80 wt % Pt/C, E-TEK) mixed with 20 wt % PTFE, and the second layer is 1.0 mg Pt/cm$^2$ (80 wt % Pt/C, E-TEK) mixed with 15 wt % NAFION. A thin layer of 5 wt % NAFION solution was finally spread onto the surface of cathode (1.0 mg NAFION/cm$^2$).

The MEAs with an active electrode area of five cm$^2$ were obtained by hot-pressing a cathode, compact Pt—Ru/CNTs coated NAFION 115 membrane and an anode diffusion layer with a pressure of 50 kg/cm$^2$, at 135° C. for three minutes. For comparison, two conventional anode catalyst layers were prepared by spraying. The catalyst area loading were 2.0 mg Pt—Ru/cm$^2$ and 0.5 mg Pt—Ru/cm$^2$ (40 wt % Pt—Ru/C, E-TEK). The catalyst layer also contained 15 wt % NAFION. The comparison MEAs were fabricated by hot-pressing the anode, NAFION 115 and cathode according to same hot-press conditions as described above.

The MEAs were tested in a home-made automatic DMFC cell test instrument with a Scribner electronic load. The operation conditions are described as follows: The oxygen operating pressure was 0.2 M Pa and the flow rate was 200 mL/min, and the methanol concentration was 1 M and flow rate was 2 mL/min. The temperature of cell and cathode humidifier was 90° C. and 75° C., respectively.

The XRD patterns for the Pt—Ru/CNT samples were observed. The diffraction peak at 23-27° observed is attributed to the hexagonal graphite structure, which can reflect the graphite degree of a carbon material. Among all of the samples, MWNTs have the highest diffraction peak, indicating that MWNTs have the highest graphite degree and likely the best electrical conductivity. SWNTs, DWNTs, and CB appear to have similar graphite degree. The analysis of other diffraction peaks shows that all catalysts, Pt—Ru/CNT and Pt—Ru/C, have a Pt face centered cubic (fcc) crystal structure and Pt and Ru did not form alloys. No Ru peak was detected, suggesting that Ru exists in an amorphous form. From the isolated Pt (220) peak, the mean particle size was about 2.0 nm, calculated with the Scherrer form method, very small Pt—Ru nanoparticles can be produced. The particle size does not depend on the support type because the Pt—Ru colloidal nanoparticles were produced before they were deposited onto the support.

Figure 22A:
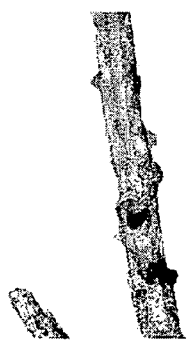
FIGS. 22A-22F are TEMs of platinum-ruthenium multi-walled carbon nanotubes.
Figure 22B:
Figure 22C:
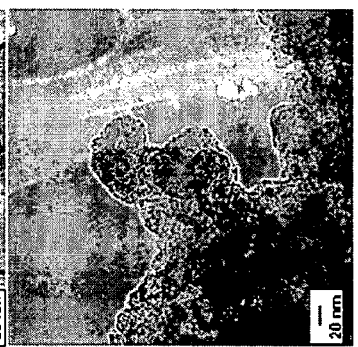
Figure 22D:
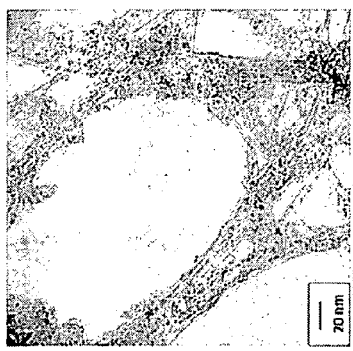
Figure 22E:
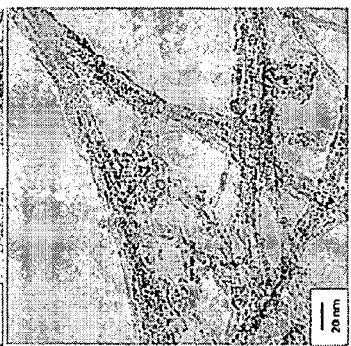
Figure 22F:
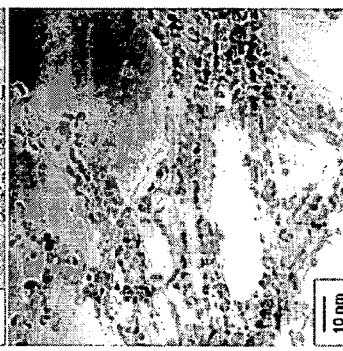
Figure 23A:
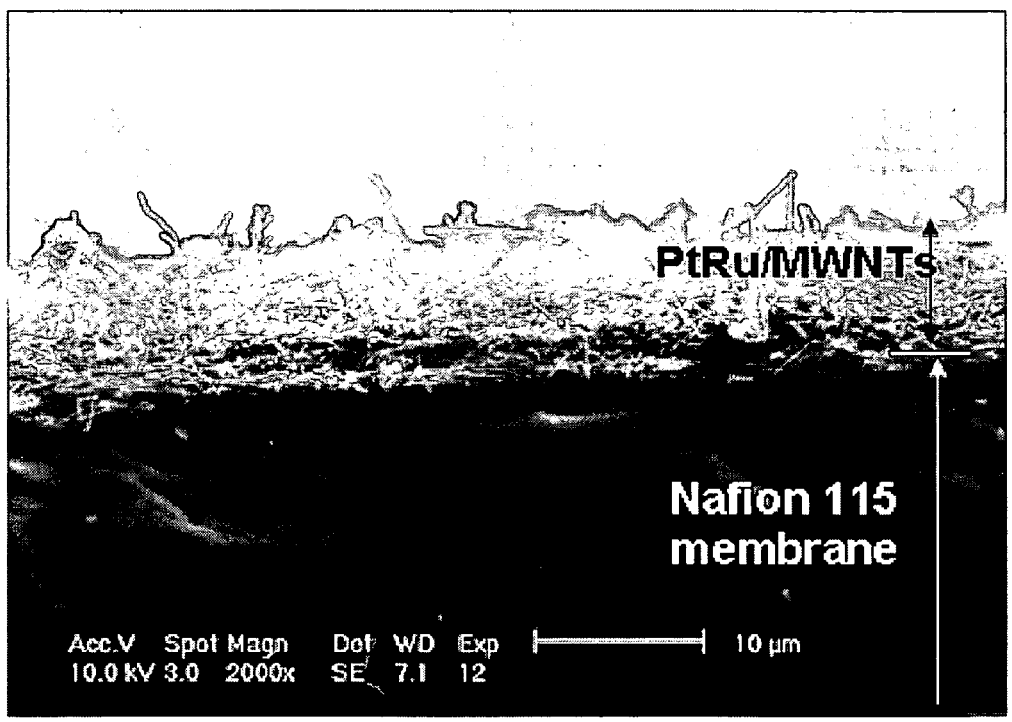
FIGS. 23A-23D are SEMs of platinum-ruthenium dual-walled nanotubes on a NAFION membrane and associated elemental analysis plots.
Figure 23C:
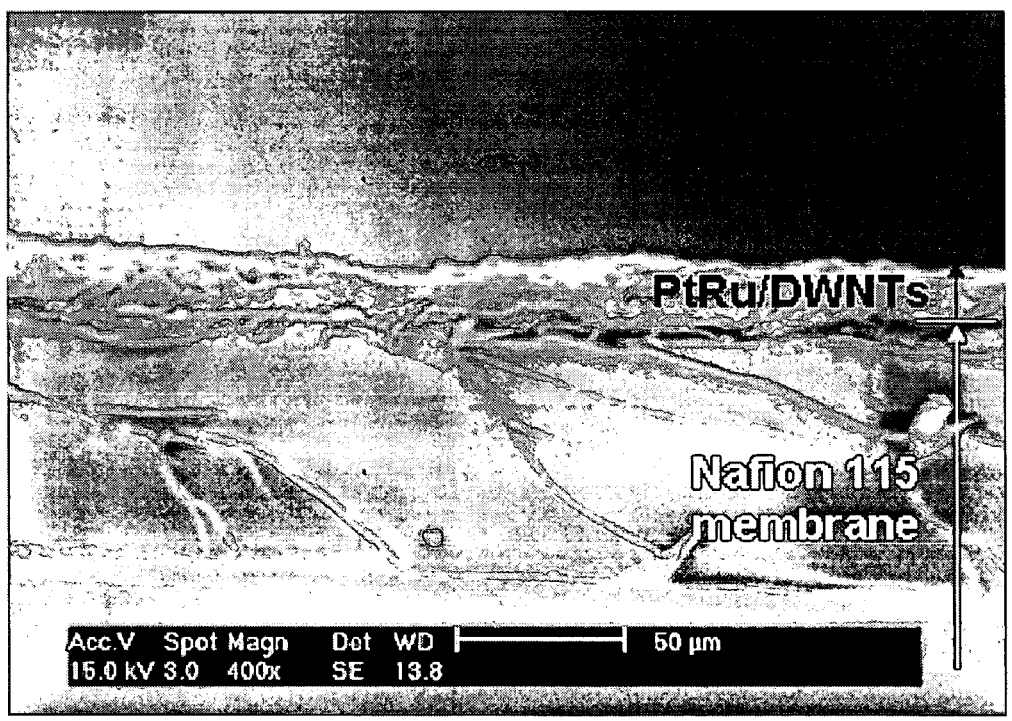
Figure 23B:
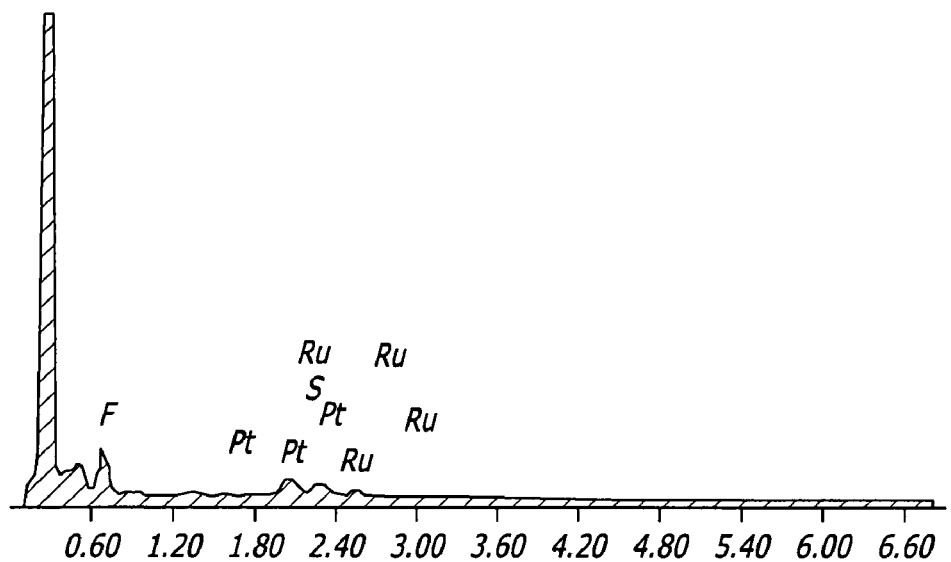
Figure 23D:
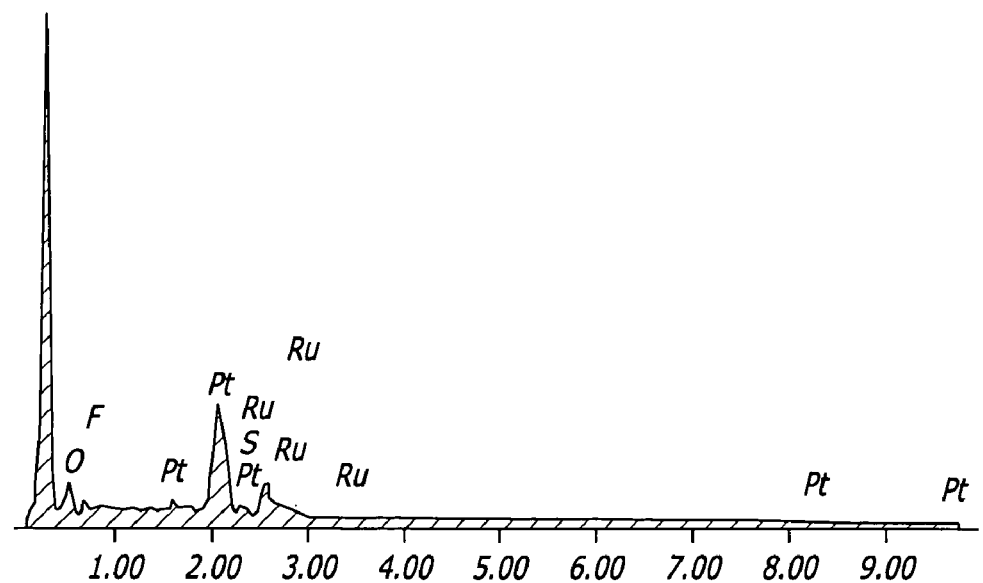
Figure 24A:
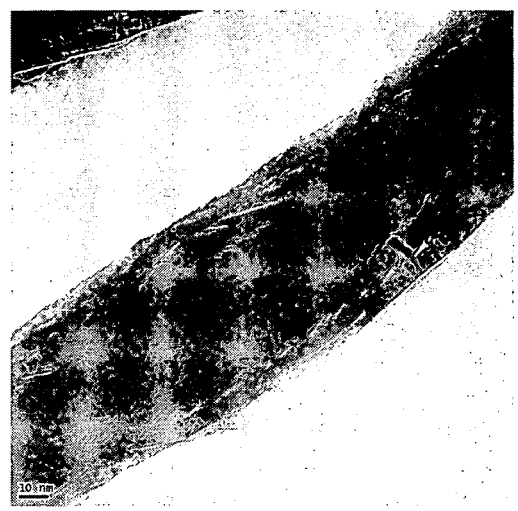
FIGS. 24A-24C are TEMs of cup-stacked carbon nanotubes.
Figure 24B:
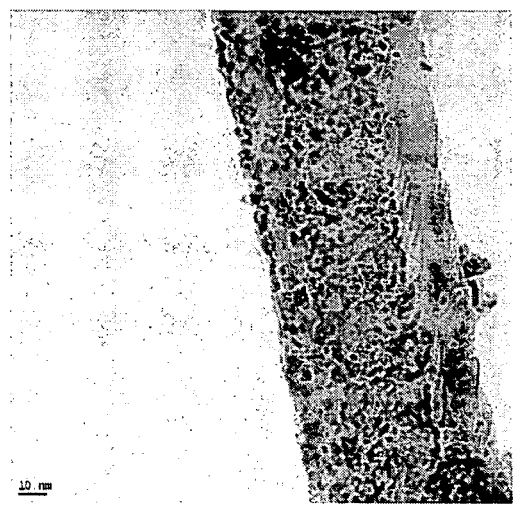
Figure 24C:
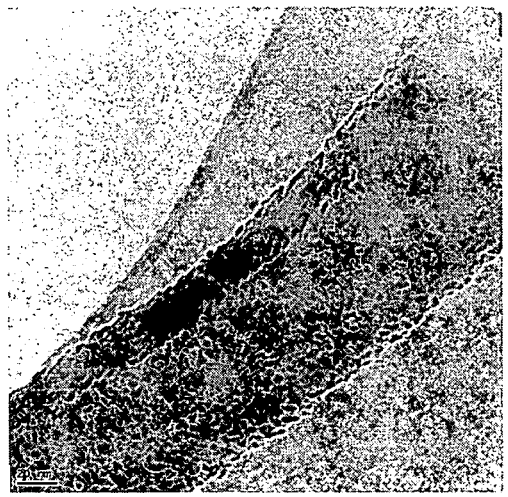
Figure 25:
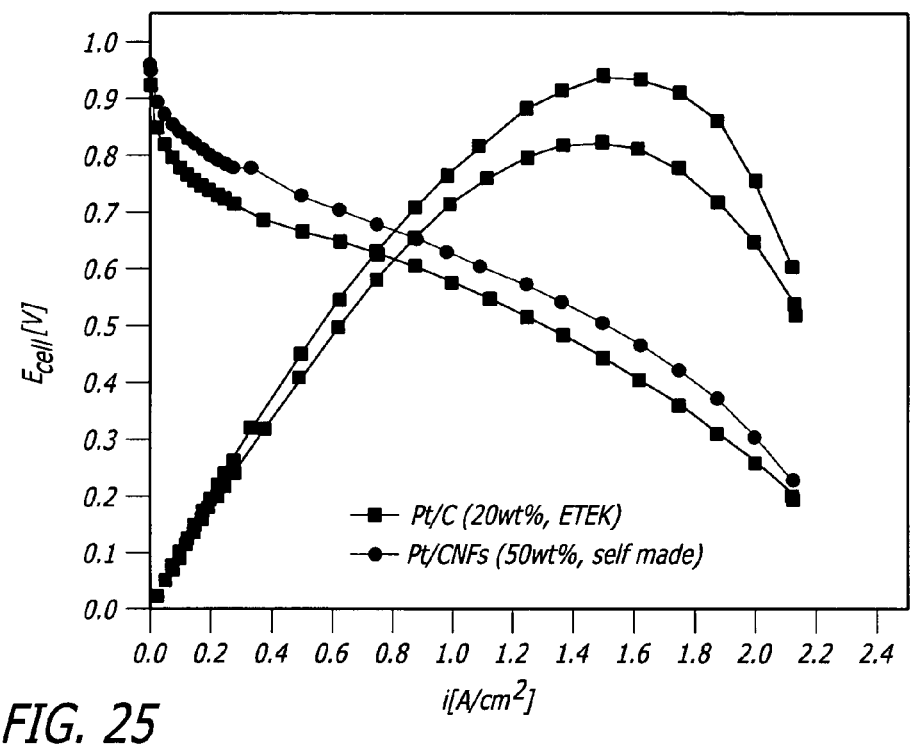
FIG. 25 depicts polarization curves of cup-stacked carbon nanotubes.
Figure 26:
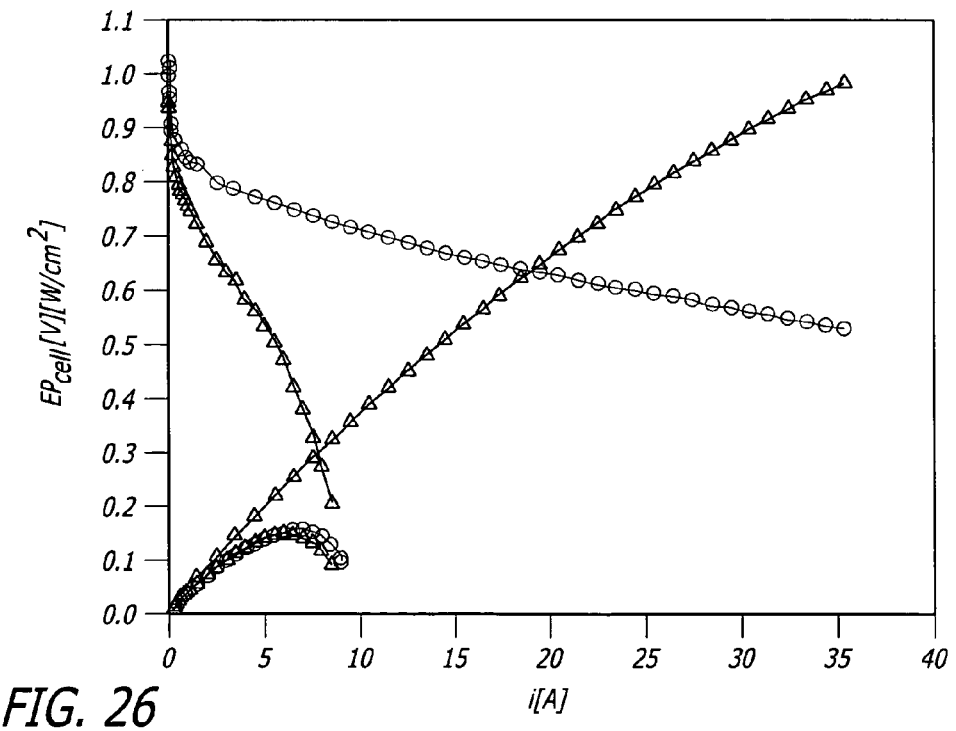
FIG. 26 depicts polarization curves for platinum containing stacked cup nanotubes.
Figure 27:
FIG. 27 is a TEM of a raw cup-stacked carbon nanotube.
Figure 28:
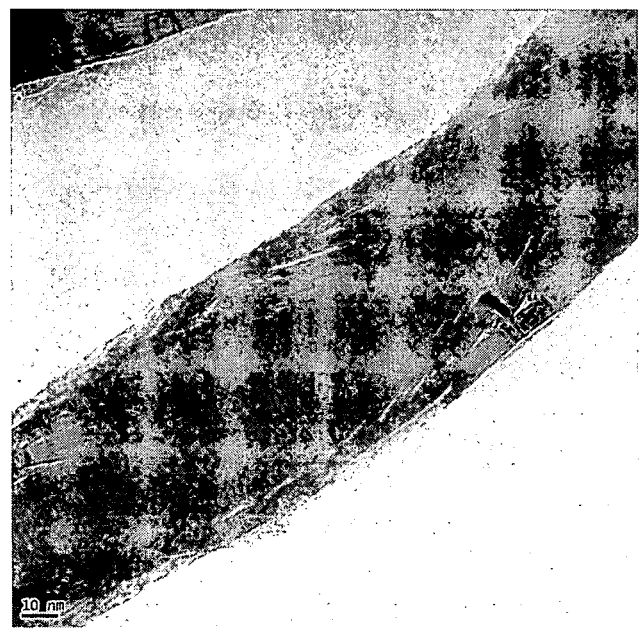
FIG. 28 is a TEM of a cup-stacked carbon nanotube after oxidation.
Figure 29A:
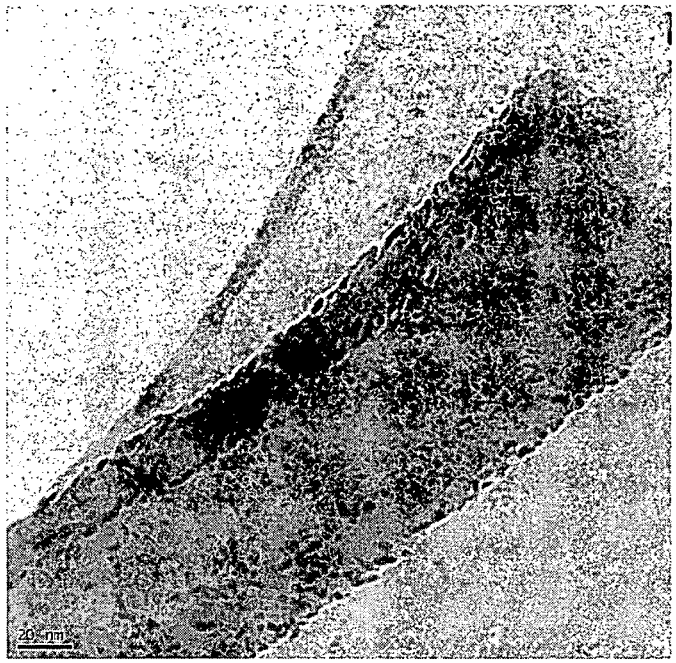
FIGS. 29A and 29B are TEMs of platinum containing cup-stacked carbon nanotubes of about 22 weight percent and 15 weight percent platinum.
Figure 29B:
Figure 30A:
FIGS. 30A and 30B are TEMs of platinum containing cup-stacked carbon nanotubes having about thirty weight percent platinum.
Figure 30B:
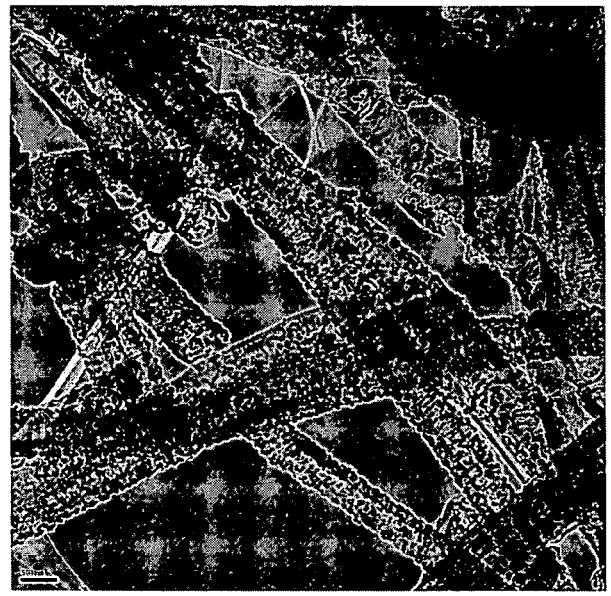
Figure 31:
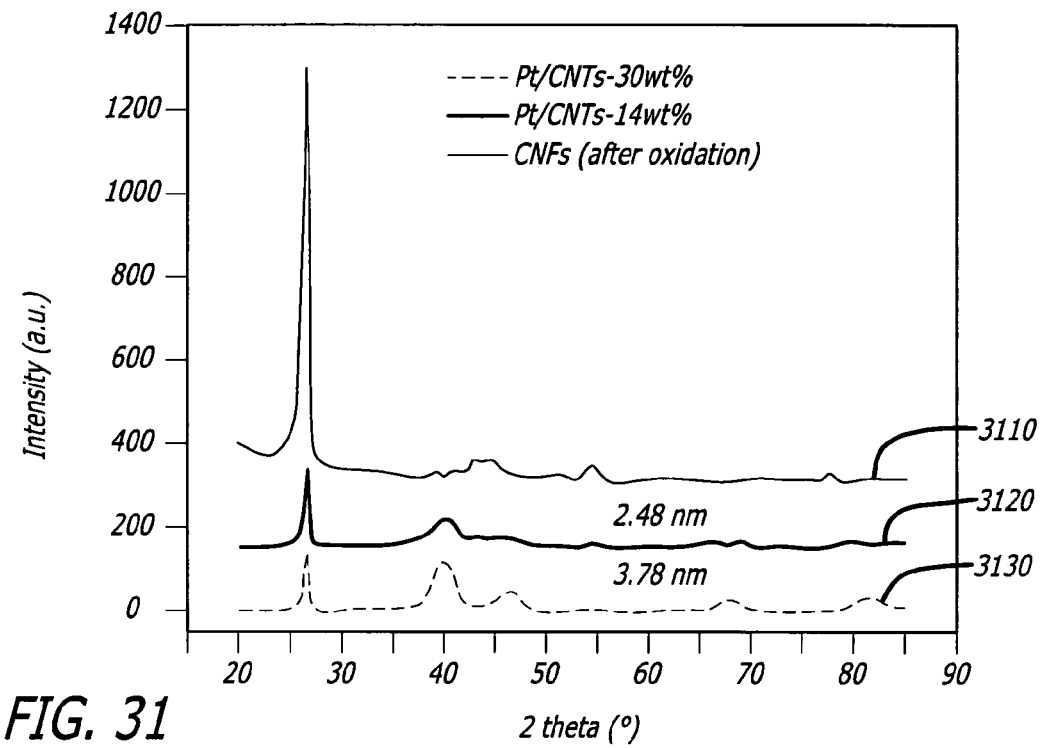
FIG. 31 is an XRD plot for cup-stacked carbon nanotubes (nanofibers).
Figure 32:
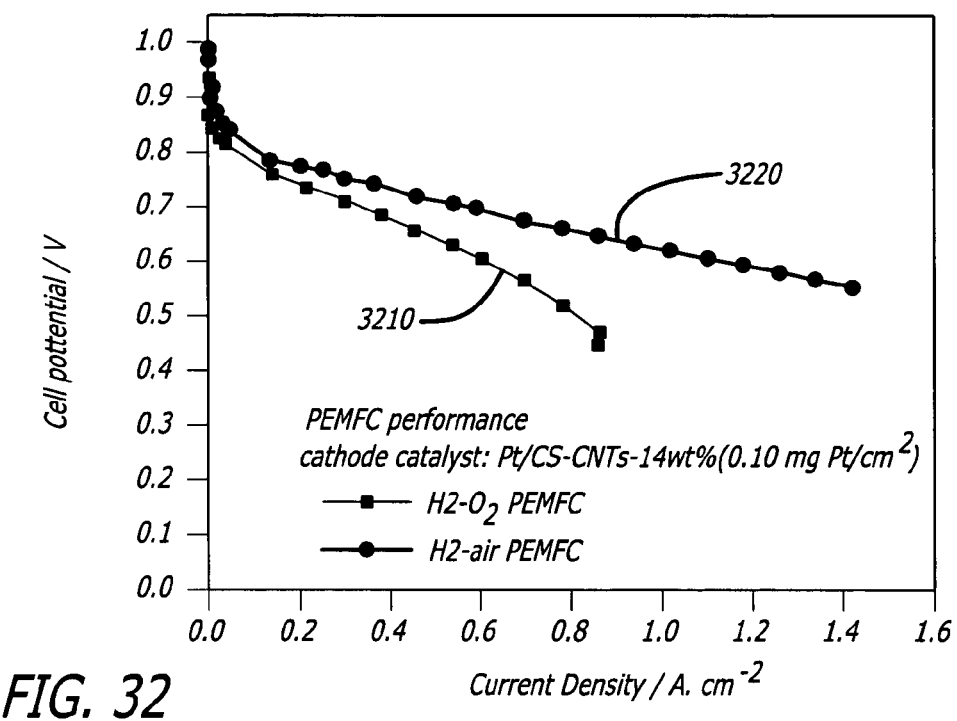
FIG. 32 depicts polarization curves for PEMFCs containing cup-stacked carbon nanotubes.
Figure 33:
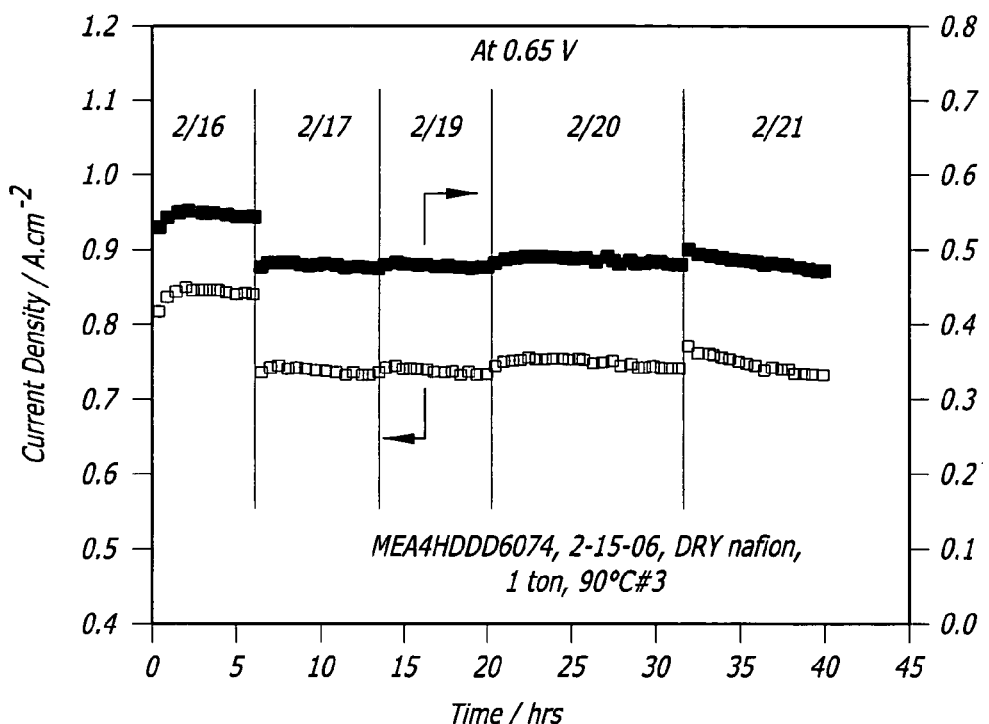
FIG. 33 is a current density versus time (durability test) plot for cup-stacked carbon nanotubes.
Figure 34:
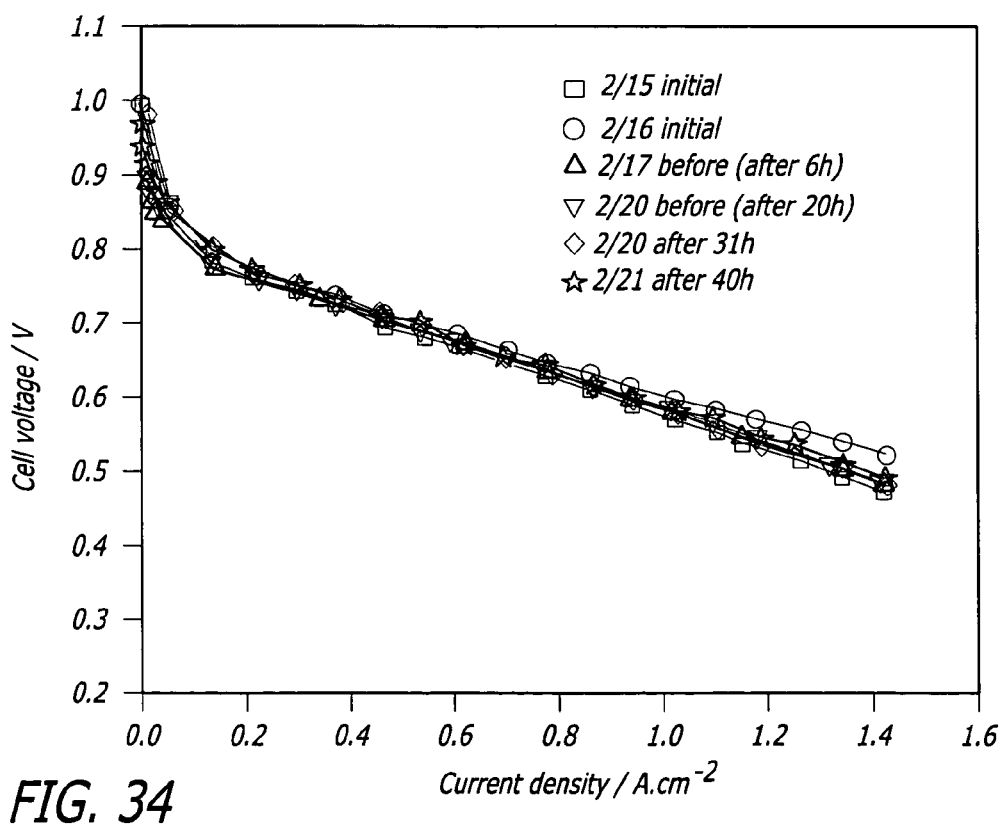
FIG. 34 is a cell voltage versus current density (durability test) plot of cup-stacked carbon nanotubes.
Figure 35:
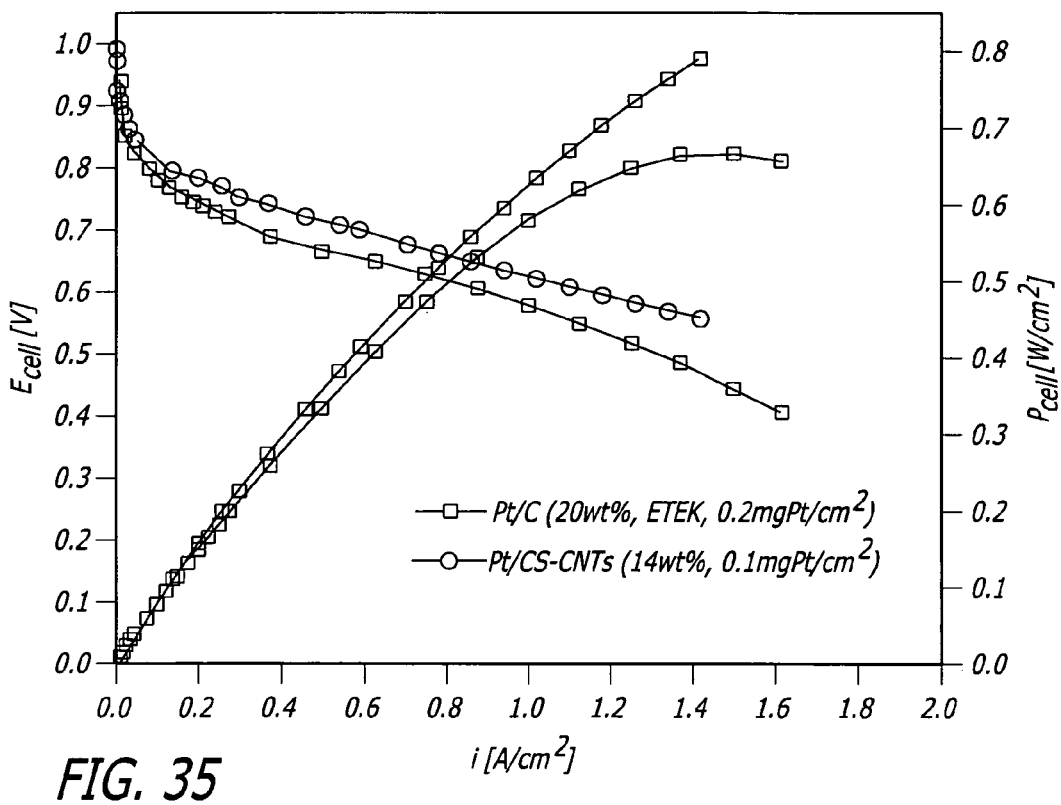
FIG. 35 depicts polarization curves for platinum containing cup-stacked carbon nanotubes.
Figure 36:
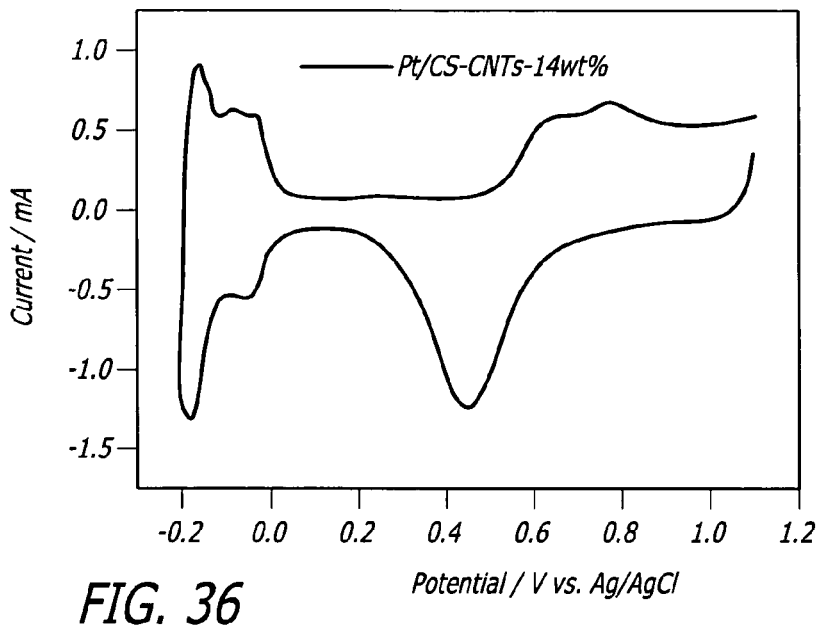
FIG. 36 is a current versus potential plot of platinum containing cup-stacked carbon nanotubes compared to silver and silver chloride reference electrode.
Figure 37:
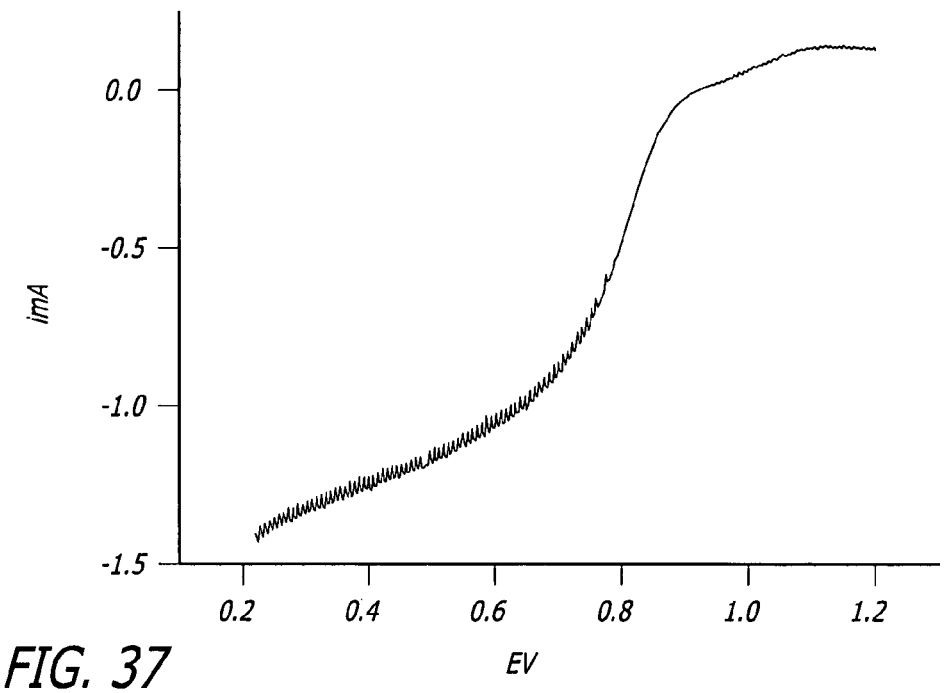
FIG. 37 is a plot of the oxidation reduction reaction of platinum containing cup-stacked carbon nanotubes.
Figure 38:
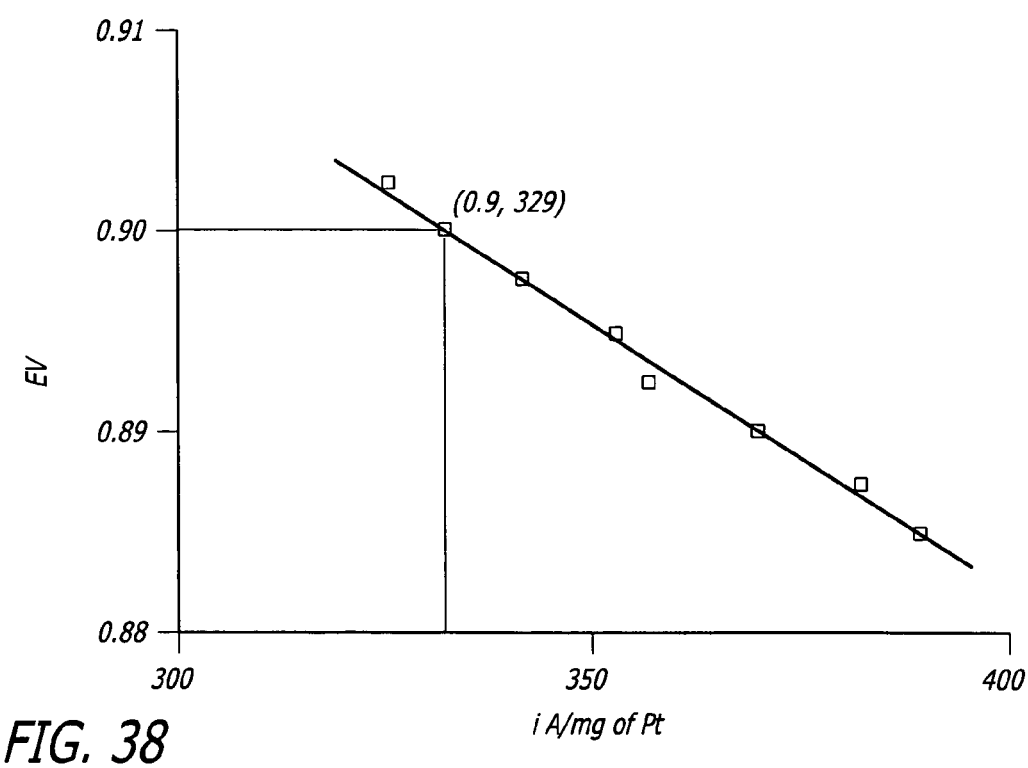
FIG. 38 is a Tafel plot for RDE data of cup-stacked carbon nanotubes.

Typical TEM images of the Pt—Ru/MWNT, Pt—Ru/SWNT, Pt, Ru/C and Pt—Ru/DWNT catalysts are shown in FIGS. 22A-22F. Overall, small Pt—Ru nanoparticles with diameter from two to three nm and tightly grouped distributions are uniformly dispersed onto CNTs, even at high metal loading (i.e., 50 wt % Pt—Ru/DWNT). This is consismula for all the Pt—Ru/CNT and Pt—Ru/C samples. This suggests that by using the EG reductiotent with the XRD results. Minor aggregation of nanoparticles on MWNTs is observed, and this is attributed to the lower surface area of the MWNTs (~100 m$^2$/g) (FIG. 22A). By contrast, aggregations of nanoparticles were not observed on SWNTs, CB, or DWNTs (FIGS. 22B, 22C, 22D, 22E, and 22F), most likely because SWNTs and DWNTs have high surface areas (~500 m$^2$/g).

Figure 16:
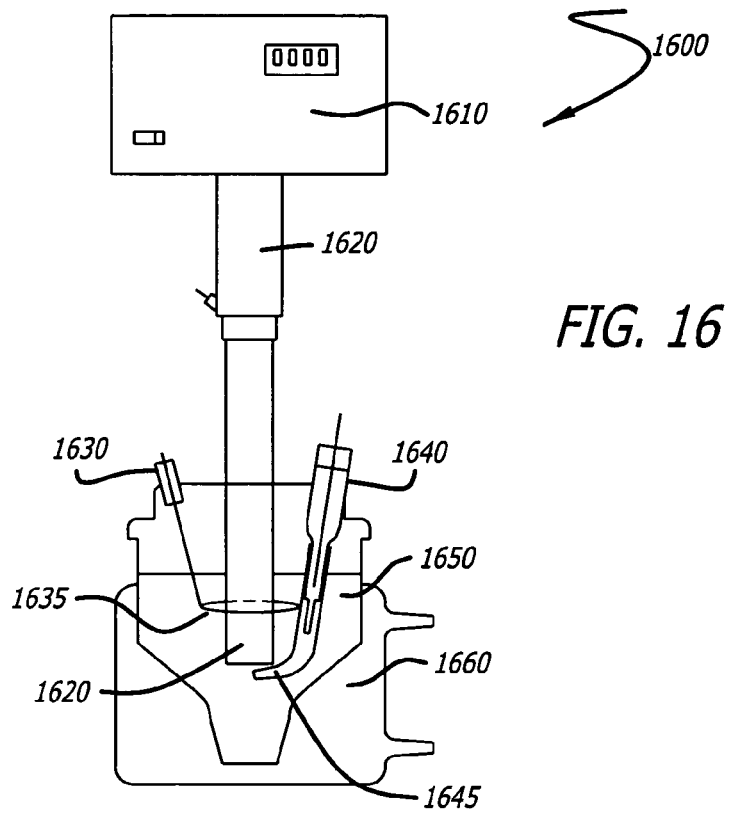
FIG. 16 is a schematic representation of a rotating disk electrode system.
Figure 17:
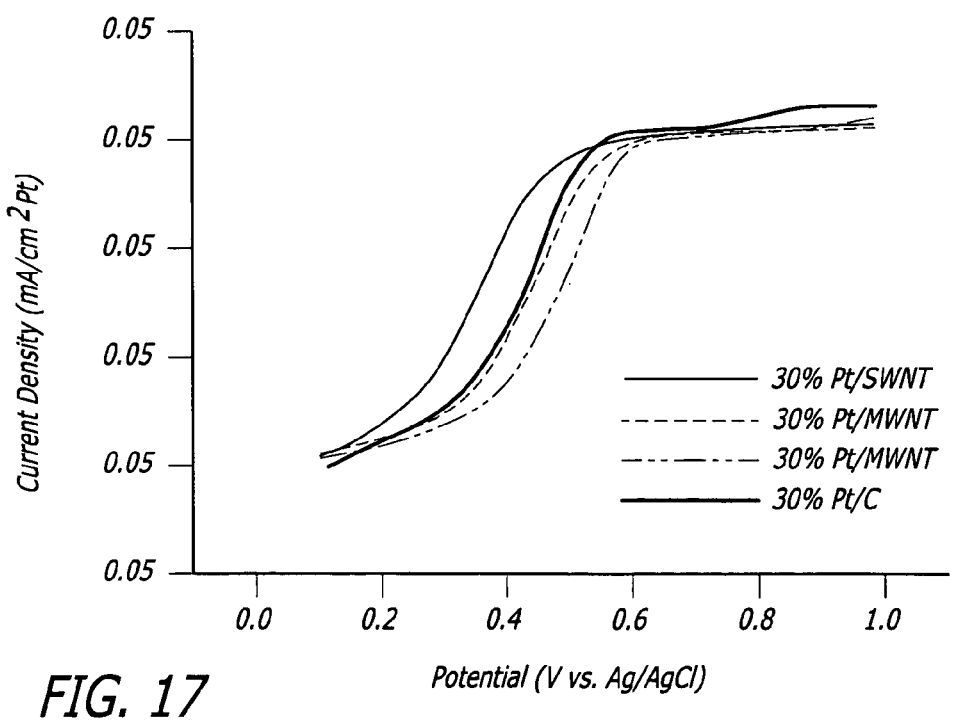
FIG. 17 is an evaluation of the electrocatalytic activity of oxygen reduction for platinum on various carbon supports.
Figure 18:
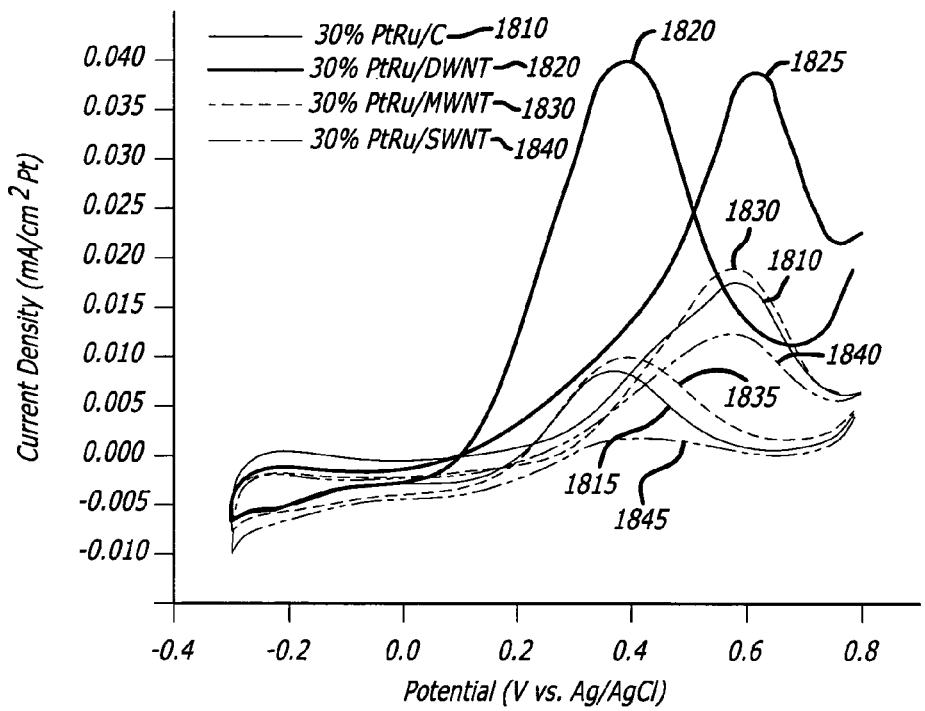
FIG. 18 is an evaluation of the electrocatalytic activity of methanol oxidation for platinum-ruthenium on various carbon supports.

Referring now to FIG. 18, the Pt—Ru/CNT and Pt—Ru/C catalysts were tested for their methanol oxidation reaction (MOR) activity in a half-cell configuration using an RDE setup (FIG. 16). RDE tests can provide the specific activity of the Pt—Ru catalyst in a well-controlled environment without mass transportation effects. Although the starting oxidation potential for these Pt—Ru catalysts were the same at about 0.1 V, the oxidation peak for Pt—Ru/DWNT is about 0.037 mA/cm$^2$Pt, which is much higher than the other samples (i.e., 0.019 mA/cm$^2$Pt for Pt—Ru/MWNT, 0.017 mA/cm$^2$Pt for Pt—Ru/C, and 0.012 mA/cm$^2$Pt for Pt—Ru/SWNT). In other words, the Pt—Ru/DWNT catalyst can generate higher currents, and thus have a higher specific activity than Pt—Ru/MWNT, Pt—Ru/CB, or Pt—Ru/SWNT catalysts. The half-cell results suggest that Pt—Ru/DWNT catalysts would be the best anode catalyst for a methanol fuel cell.

Before the fabrication of MEAs, the anode catalyst layer coated membranes were prepared. The cross-sectional SEM images and the corresponding EDAX elemental analysis of the Pt—Ru/DWNT and Pt—Ru/DWNT catalyst layer coated NAFION membranes are shown in FIGS. 23A-23D. It was noted that the MWNTs of the Pt—Ru/MWNT layers do not seem to have preferred orientation as previously observed for a Pt/MWNT cathode layer for PEMFC. It is believed that the orientation was a result of the hydrophobicity of the MWNTs and the hydrophilicity of the filter paper. Thus the unfavorable interaction forces the MWNTs to "stand up." In the present study, NAFION was sprayed during the filtration process and is probably responsible for the random orientation of the CNTs, because NAFION makes the CNT film more hydrophilic and the filter paper is also hydrophilic. The Pt—Ru/MWNT catalyst layer is about 7-8 μm and the thickness for Pt—Ru/DWNT catalyst layer about 15-20 μm.

EDAX/SEM shows that platinum and ruthenium from the catalyst, carbon from support, and fluorine and sulfur from the NAFION are all present. The presence of fluorine and sulfur suggests that NAFION was mixed well within Pt—Ru/CNT catalyst layer, and this is believed to be essential to facilitate the mass transportation of the fuel, methanol. For elemental analysis, five spots of the catalyst layer were examined from each sample, and the calculated Pt:Ru ratio is 1:1.

Figure 19:
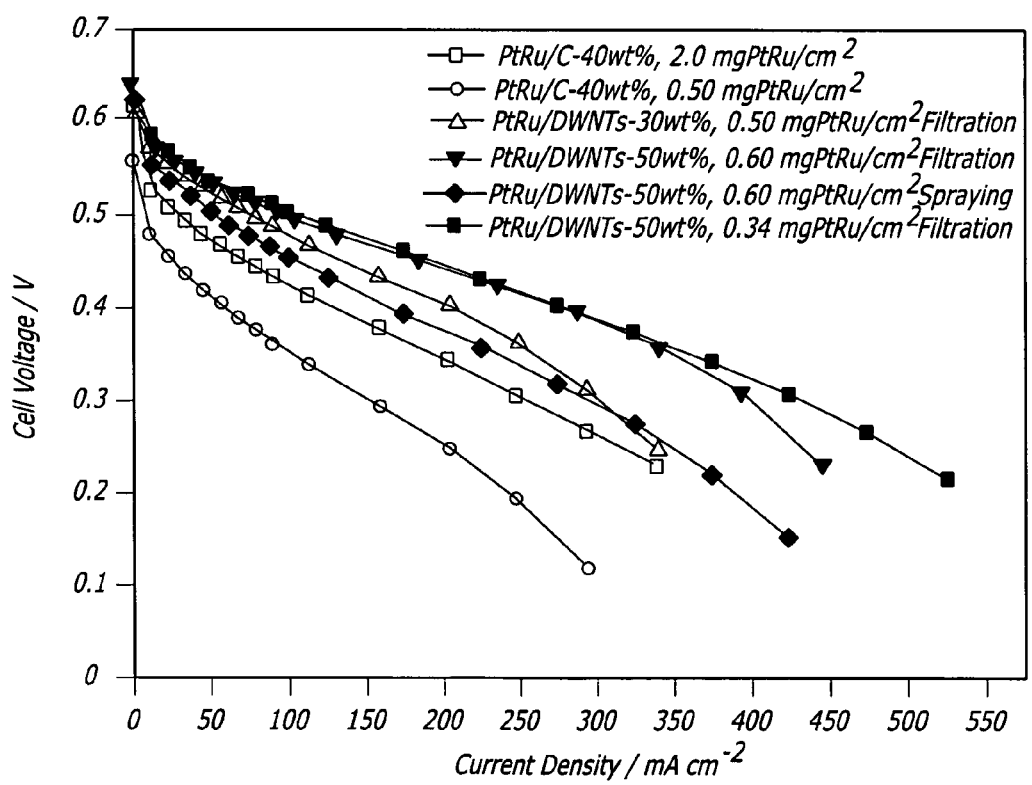
FIG. 19 depicts polarization curves for PtRu on carbon black and dual-walled carbon nanotubes.

The I-V curves of single DMFCs with different anode catalyst supports and metal electrode loadings are shown in FIG. 19. The open circuit voltage (OCV) for the Pt—Ru/DWNT catalyst (30 wt %, 0.5 mg/cm2) is 0.627 V, which is 50 mV higher than that of Pt—Ru/C (30 wt %, 0.50 mg/cm$^2$). Even when the electrode loading for the Pt—Ru/C was increased to 2.0 mg/cm$^2$, the OCV was still about 0.620 V. The OCVs of Pt—Ru/MWNT and Pt—Ru/SWNT based cells are 0.610 V and 0.583 V, respectively. From a theoretical point of view, the value of OCV can reflect the activity of the anode catalyst because the same cathode was used. The high OCV shown by the Pt—Ru/DWNT catalyst suggests that it has the highest MOR activity, which is consistent with the RDE results.

In the activation controlled region (i.e., at 0.55 V) the current density for Pt—Ru/DWNT catalyst of 0.5 mg/cm$^2$ is 26 mA/cm$^2$, which is much higher than that of Pt—Ru/C catalyst with the same electrode loading (0.5 mg/cm$^2$, 1.5 mA/cm2) and even much higher when the electrode metal loading is four times as high (2.0 mg/cm$^2$, 8.5 mA/cm$^2$).

The remarkably high MOR activity of Pt—Ru/DWNT is not fully understood. Some of the possible favorable factors are its high electrical conductivity, high surface area, and small diameter. The small diameter of the DWNTs may have lead to a unique interaction between platinum and the DWNTs that facilitates charge transfer from platinum to the tubes, and thus increasing the specific activity of platinum. The bundle morphology of the DWNTs may also help the uniform dispersion and retention of NAFION—further improving platinum mass activity.

From the overall I-V curves, Pt—Ru/DWNT catalyst (0.5 mg/cm$^2$) outperforms Pt—Ru/MWNT at low current density regions, but it looses its advantage at the high current density regions. This is probably attributed to the fact that the Pt—Ru/DWNT layer is thicker than Pt—Ru/MWNT layer (15-20 μm vs. 7-8 μm). In addition, it is also found that Pt—Ru/SWNT catalyst shows the lowest DMFC performance among all DMFC single cells, which is most likely because, that the SWNTs are usually a mixture of electrically conducting and semiconducting tubes.

To further improve the overall performance, a Pt—Ru/DWNT catalyst with high metal loading (50 wt %) was prepared and used in an MEA with low electrode metal loading of 0.34 mg/cm$^2$. Its DMFC I-V curve is also shown in FIG. 19. This MEA showed a superior DMFC performance at the whole current density range and had the highest power density of 131 mW/cm$^2$. This is obviously attributed to its higher MOR, specific activity, and thinner catalyst layer. It is exciting to note that the DWNT supported Pt—Ru anode catalyst could offer a 63% enhancement of the DMFC's highest performance when compared with carbon black supported anode catalyst with a 5.9 times more Pt—Ru noble metal.

The methods described regarding single-walled, dual-walled and multi-walled carbon nanotubes may also be applied to cup-stacked carbon nanotubes. Various TEMs, SEMs, polarization curves and other related data are shown in FIGS. 24-38 for forming an electrocatalyst with cup-stacked carbon nanotubes.

EXAMPLES

The following examples are provided to illustrate the embodiments of the present invention. They are not intended to limit the scope of this disclosure to the embodiments exemplified therein. All ranges for all parameters disclosed are inclusive of the range limits.

Example 1

Single-Walled Carbon Nanotubes

Process A:
1) Weigh SWNTs 1.00 g, put it into flask (250 mL with 3 necks);
2) Add 120 mL 2M $H_2SO_4$+4M $HNO_3$ into the flask, stir it at 1000 rpm for 10 minutes (min) at room temperature;
3) Ultrasonicate it for another 20 min;
4) Put the flask in a mantle heater (1000 rpm), increasing temperature to 110° C. for eight hours;
5) Dilute the solvent by adding another 200 mL DI water in the above-mentioned flask;
6) Filtrate it by normal filter paper and then by copious water (1 L hot DI water, 85° C.) in batches;
7) Put the funnel with the filter paper and filtrate cake into a convection oven at 110° C. for eight hours;
8) After drying, put the support into a glass bottle for later use.

Process B:
1) Weigh SWNTs 1.00 g, put it into the flask (500 mL with 3 necks);
2) Add 150 mL EG into the flask and stir it for 10 min;
3) Ultrasonicate it for another 20 min (suspension becomes ink);
4) Put the flask in a heating mantle (hot plate/stirrer) and set the stirring rate of 1000 rpm (the following procedures are all under stirring);
5) Add 0.75 g $H_2PtCl_6 \cdot xH_2O$ (37.5% Pt) and 0.29 g $RuCl_3$ (48.3% Ru) in 30 mL EG by dropping (using funnel);
6) Let $N_2$ go through the flask and stir for 30 min, the following procedures are all under $N_2$ protection;
7) Add 22 mL 1.0 M NaOH by dropping (using funnel) into the flask to make pH=13;
8) Stir for another 30 min;
9) Increase the heating mantle's temperature to 135° C. in 15 min;
10) Keep flask under refluxing at the temperature (135° C.) for 3 h with 1000 rpm;
11) Cool down the flask naturally, keep at room temperature for one hour with 1000 rpm;
12) Add 200 mL DI water into the flask;
13) Add 10 mL 2 M HCl by dropping (using funnel) into the flask to make the pH=3;
14) Keep Stirring for 1.0 hour;
15) Stop stirring and wait for 1.0 hour;
16) Filtrate the PtRu/SWNTs (30 wt % Pt—Ru) solid with a regular filter paper (Grade No. 3), diameter 4 cm, wash it by 1 L hot DI water at 85° C.;
17) Put the funnel with the filter paper and filtrate cake into a vacuum oven at 85° C. for eight hours;
18) After drying, put the catalyst into a bottle for later use.

Process C:
1) Weigh PtRu/SWNTs 42 mg, put it into flask;
2) Add a drop of $H_2O$ to wet PtRu/SWNTs;
3) Add 10 mL ethanol and 362 mg NAFION (5 wt %);
4) Ultrasonic treating for 20 min, in order to make it become ink;
5) Put a normal filter paper first, and then put a Nylon paper (2 cm in diameter) in the funnel, drop 1 mL ethanol to wet the paper;
6) Add the ink into the funnel;
7) Filter the ink to get a black solid onto the Nylon paper;
8) Weigh 420 mg NAFION solution (5 wt %) in a 50 mL beaker and dilute it by same volume of ethanol, ultrasonic for 5 min;
9) Spraying the NAFION solution to surface of PtRu/SWNTs deposited onto the Nylon filter, and drying it naturally in the hood for 20 mins;
10) Cut the filter paper with PtRu/SWNTs catalyst into 1 piece of 2.0*2.0 cm$^2$;
11) Hot-pressing an anode, NAFION 115 membrane and a piece of filter paper with PtRu/SWNTs at 120° C., 0.15 metric tons for 15 seconds;
12) Carefully peel the filter paper off;
13) Put the PtRu/SWNTs coated NAFION 115 membrane in a plastic bag for MEA preparation;
14) Hot pressing a cathode and the PtRu/SWNTs coated NAFION 115 membrane at 135° C., 1.2 metric tons for 1.5 min.

Example No. 2

Dual-Walled Carbon Nanotubes

Process A:
1) Weigh DWNTs 1.00 g, put it into flask (250 mL with 3 necks);
2) Add 120 mL 2 M $H_2SO_4$+4 M $HNO_3$ into the flask, stir it at 1000 rpm for 10 min at room temperature;
3) Ultrasonicate it for another 20 min;
4) Put the flask in a mantle heater (1000 rpm), increasing temperature to 110° C. for eight hours;
5) Dilute the solvent by adding another 200 mL DI water in the above mentioned flask;
6) Filtrate it by normal filter paper and then by copious water (1 L hot DI water, 85° C.) in batches;
7) Put the funnel with the filter paper and filtrate cake into a convection oven at 110° C. for eight hours;
8) After drying, put the support into a glass vial for later use.

Process B:
1) Weigh DWNTs 1.00 g, put it into the flask (500 mL with 3 necks);
2) Add 150 mL EG into the flask and stir it for 10 min;
3) Ultrasonicate it for another 20 min (suspension becomes ink);
4) Put the flask in a heating mantle (hot plate/stirrer) and set the stirring rate of 1000 rpm (the following procedures are all under stirring);
5) Add 0.75 g $H_2PtCl_6 \cdot xH_2O$ (37.5% Pt) and 0.29 g $RuCl_3$ (48.3% Ru) in 30 mL EG by dropping (using funnel);
6) Let $N_2$ go through the flask and stir for 30 min, the following procedures are all under $N_2$ protection;
7) Add 22 mL 1.0 M NaOH by dropping (using funnel) into the flask to make pH=13;
8) Stir for another 30 min;
9) Increase the heating mantle's temperature to 135° C. in 15 min;
10) Keep flask under refluxing at the temperature of 135° for three hours with 1000 rpm;
11) Cool down the flask naturally, keep at room temperature for one hour with 1000 rpm;
12) Add 200 mL DI water into the flask;
13) Add 10 mL 2 M HCl by dropping (using funnel) into the flask to make the pH=3;
14) Keep Stirring for 1.0 hour;
15) Stop stirring and wait for 1.0 hour;
16) Filtrate the PtRu/DWNTs (30 wt % Pt—Ru) solid with a regular filter paper (Grade No. 3) diameter 4 cm, wash it by 1 L hot DI water (85° C.);
17) Put the funnel with the filter paper and filtrate cake into a vacuum oven at 85° C. for eight hours;
18) After drying, put the catalyst into a bottle for later use.

Process C:
1) Weigh PtRu/DWNTs 21 mg, put it into flask;
2) Add a drop of $H_2O$ to wet PtRu/DWNTs;
3) Add 5.5 mL ethanol and 180 mg NAFION (5 wt %);
4) Ultrasonic treating for 20 min, in order to make it become ink;
5) Put a normal paper first, and then put a Nylon paper (4 cm in diameter) in the funnel, drop 1 mL ethanol to wet the paper;
6) Add the ink into the funnel;
7) Weigh 123 mg NAFION (5 wt %), and dilute it with same volume of ethanol and then put into airbrush;
8) Filter the ink to get a black solid onto the Nylon paper gradually by 5 times, after one time, spray NAFION on the top of the filtrate cake;
9) Weigh 210 mg NAFION solution (5 wt %) in a 50 mL beaker and dilute by same volume of ethanol, ultrasonic for 5 min;
10) Spraying the NAFION solution to surface of PtRu/DWNTs deposited onto the Nylon filter paper, and drying it naturally in the hood for 20 mins;
11) Cut the filter paper with PtRu/DWNTs catalyst into 1 piece of 2.0*2.0 $cm^2$;
12) Hot-pressing an anode, NAFION 115 membrane and a piece of filter paper with PtRu/DWNTs at 120° C., 0.15 metric tons for 15 seconds;
13) Carefully peel the filter paper off;
14) Put the PtRu/DWNTs coated NAFION 115 membrane in a plastic bag for MEA preparation;
15) Hot pressing a cathode and the PtRu/DWNTs coated NAFION 115 membrane at 135° C., 1.2 metric tons for 1.5 min.

Example No. 3

Cup-Stacked Carbon Nanotubes

Process A:
1) Weigh CS-CNTs 1.00 g, put it into flask (250 mL with 3 necks);
2) Add 120 mL 2M $H_2SO_4$+4M $HNO_3$ into the flask, stir it at 1000 rpm for 10 min at room temperature;
3) Ultrasonicate it for another 20 min;
4) Put the flask in a mantle heater (1000 rpm), increasing temperature to 110° C. for eight hours;
5) Dilute the solvent by adding another 200 mL DI water in the above mentioned flask;
6) Filtrate it by normal filter paper and then by copious water (1 L hot DI water, 85° C.) in batches;
7) Put the funnel with the filter paper and filtrate cake into a conventional oven at 110° C. for eight hours;
8) After drying, put the support into a glass bottle for later use.

Process B:
1) Weigh CS-CNTs 1.00 g, put it into the flask (500 mL with 3 necks);
2) Add 150 mL EG into the flask and stir it for 10 min;
3) Ultrasonicate it for another 20 min (suspension becomes ink);
4) Put the flask in a heating mantle (hot plate/stirrer) and set the stirring rate of 1000 rpm (the following procedures are all under stirring);
5) Add 1.14 g $H_2PtCl_6 \cdot xH_2O$ (37.5% Pt) in 30 mL EG by dropping (using funnel);
6) Let $N_2$ go through the flask and stir for 30 min, the following procedures are all under $N_2$ protection;
7) Add 22 mL 1.0 M NaOH by dropping (using funnel) into the flask to make pH=13;
8) Stir for another 30 min;
9) Increase the heating mantle's temperature to 135° C. in 15 min;
10) Keep flask under refluxing at the temperature (135° C.) for three hours with 1000 rpm;
11) Cool down the flask naturally, keep at room temperature for one hour with 1000 rpm;
12) Add 200 mL DI water into the flask;
13) Add 10 mL 2 M HCl by dropping (using funnel) into the flask to make the pH=3;
14) Keep Stirring for 1.0 hour;

15) Stop stirring and wait for 1.0 hour;
16) Filtrate the Pt/CS-CNTs (30 wt % Pt) solid with a regular filter paper (Grade No. 3) diameter 4 cm, wash it by 1 L hot DI water (85° C.);
17) Put the funnel with the filter paper and filtrate cake into a vacuum oven at 85° C. for eight hours;
18) After drying, put the catalyst into a bottle for later use.

Process C:
1) Weigh Pt/CS-CNTs 153 mg, put it into flask;
2) Add a drop of $H_2O$ to wet Pt/CS-CNTs;
3) Add 5.5 mL ethanol;
4) Ultrasonic treating for 20 min, in order to make it become ink;
5) Put a normal paper before the special paper first, and then put a Nylon paper (4 cm in diameter) in the funnel, drop 10 mL ethanol to wet the paper;
6) Add the catalyst ink into the funnel;
7) Filter the ink to get a black solid onto the Nylon paper;
8) Weigh 1.53 g NAFION solution (5 wt %) in a 100 mL beaker and dilute by a 100 mL of ethanol, ultrasonic for 5 min;
9) Spraying the NAFION solution to surface of Pt/CS-CNTs deposited onto the Nylon filter, and drying it naturally in the hood for 20 mins;
10) Cut the filter paper with Pt/CS-CNTs catalyst into 1 piece of $2\times2$ $cm^2$;
11) Hot-pressing an anode, NAFION 115 membrane and a piece of filter paper with Pt/CS-CNTs at 120° C., 0.15 metric tons for 15 secs;
12) Carefully peel the filter paper off;
13) Put the Pt/CS-CNTs coated NAFION 115 membrane in a plastic bag for MEA preparation;
14) Hot pressing a cathode and the Pt/CS-CNTs coated NAFION 115 membrane at 135° C., 1.2 metric tons for 1.5 min.

While particular forms of the invention have been illustrated and described, it will also be apparent to those skilled in the art that various modifications can be made without departing from the inventive concept. References to use of the invention with a membrane electrode assembly and fuel cell are by way of example only, and the described embodiments are to be considered in all respects only as illustrative and not restrictive. The present invention may be embodied in other specific forms without departing from its spirit or essential characteristics. Accordingly, it is not intended that the invention be limited except by the appended claims.

We claim:

1. A method for making an electrode comprising a catalyst layer coated membrane, said method comprising:
    forming a catalyst by depositing platinum onto a carbon-based material;
    filtering the catalyst onto a substrate to form a catalyst layer having an oriented film of a platinum-deposited carbon-based material;
    providing a free standing proton exchange membrane; and
    transferring the filtered catalyst layer onto the membrane to prepare the catalyst layer coated membrane.

2. The method of claim 1, wherein the carbon-based material is chosen from the group consisting of single-walled carbon nanotubes, dual-walled carbon nanotubes, multi-walled carbon nanotubes; nanofibers and cup-stacked carbon nanotubes.

3. The method of claim 1, wherein forming the catalyst includes using ethylene glycol.

4. The method of claim 1, wherein forming the catalyst includes using ruthenium.

5. The method of claim 4, wherein forming the catalyst includes using solubilized perfluorosulfonate ionomer.

6. The method of claim 1, wherein filtering the catalyst includes using ethanol.

7. The method of claim 1, wherein filtering the catalyst includes using a nylon filter paper.

8. The method of claim 1, wherein filtering the catalyst results in orientation of the catalyst substantially perpendicular to the substrate.

9. The method of claim 1, wherein transferring the filtered material includes transferring to a perfluorosulfonate ionomer membrane.

10. The method of claim 1, wherein the carbon-based material is selected from dual-walled carbon nanotubes or cup-stacked carbon nanotubes.

11. The method of claim 1, wherein the substrate is a filter paper.

12. The method of claim 1, wherein the transferring includes pressing the filtered catalyst layer on the substrate onto the membrane.

13. A method for making a membrane electrode assembly, comprising:
    forming a first catalyst by depositing platinum onto a carbon-based material;
    filtering the first catalyst onto a substrate to form a filtered first catalyst having an oriented film of a platinum-deposited carbon-based material;
    providing a free standing proton exchange membrane;
    transferring the filtered first catalyst onto a first side of the proton exchange membrane to form a catalyst layer coated membrane;
    placing a second catalyst coated second gas diffusion layer adjacent to a second side of the proton exchange membrane;
    placing a first gas diffusion layer adjacent the first catalyst layer on the first side of the proton exchange membrane; and
    using heat and pressure to seal the first gas diffusion layer, the first catalyst layer coated membrane, the second catalyst coated second gas diffusion layer together to produce the membrane electrode assembly.

14. The method of claim 13, wherein the carbon-based material is chosen from the group consisting of single-walled carbon nanotubes, dual-walled carbon nanotubes, multi-walled carbon nanotubes; nanofibers and cup-stacked carbon nanotubes.

15. The method of claim 13, wherein forming the first catalyst includes using ethylene glycol.

16. The method of claim 13, wherein forming the first catalyst includes using ruthenium.

17. The method of claim 16, wherein forming the first catalyst includes using solubilized perfluorosulfonate ionomer.

18. The method of claim 13, wherein the carbon-based material is selected from dual-walled carbon nanotubes or cup-stacked carbon nanotubes.

19. The method of claim 13, wherein the substrate is a filter paper.

* * * * *